US012437533B2

(12) United States Patent
Wang et al.

(10) Patent No.: US 12,437,533 B2
(45) Date of Patent: Oct. 7, 2025

(54) SYSTEM FOR DETERMINING STREAMFLOW DURATION FROM REMOTELY-SENSED IMAGERY

(71) Applicants: Zhaocheng Wang, Mesa, AZ (US); Enrique Vivoni, Tempe, AZ (US)

(72) Inventors: Zhaocheng Wang, Mesa, AZ (US); Enrique Vivoni, Tempe, AZ (US)

(73) Assignee: ARIZONA BOARD OF REGENTS ON BEHALF OF ARIZONA ATATE UNIVERSITY, Scottsdale, AZ (US)

( * ) Notice: Subject to any disclaimer, the term of this patent is extended or adjusted under 35 U.S.C. 154(b) by 184 days.

(21) Appl. No.: 18/163,077

(22) Filed: Feb. 1, 2023

(65) Prior Publication Data
US 2023/0245447 A1     Aug. 3, 2023

Related U.S. Application Data

(60) Provisional application No. 63/305,975, filed on Feb. 2, 2022.

(51) Int. Cl.
*G06V 20/20*     (2022.01)
*G01C 13/00*     (2006.01)
(Continued)

(52) U.S. Cl.
CPC ......... *G06V 20/194* (2022.01); *G01C 13/002* (2013.01); *G06V 10/75* (2022.01);
(Continued)

(58) Field of Classification Search
CPC .... G01C 13/002; G01C 13/008; G06V 20/13; G06V 20/182; Y02A 10/40; Y02A 90/30; G01F 1/002
See application file for complete search history.

(56) References Cited

U.S. PATENT DOCUMENTS 5,323,317 A * 6/1994 Hampton .............. B64G 1/66
                                               702/3
10,161,770 B2 * 12/2018 Rick ...................... G01S 15/60
(Continued)

FOREIGN PATENT DOCUMENTS

| CN | 105046087 B | 7/2016 |
|---|---|---|
| CN | 103994976 B | 12/2017 |

OTHER PUBLICATIONS

Acuña, V., et al. (2014), "Why should we care about temporary waterways?", Science, American Association for the Advancement of Science, Mar. 7, p. 1080-1081.
(Continued)

*Primary Examiner* — Frank Johnson
(74) *Attorney, Agent, or Firm* — Michael Best & Friedrich LLP

(57) ABSTRACT

Systems and methods for determining varying phenomena in an environment. In an embodiment, an system includes a processor configured to receive a sequence of remote sensing data regarding an environment, wherein the environment comprises a target area where changes have occurred and a surrounding area where few or no changes have occurred; process the RS data to determine signals for the changes that have occurred in the target area and where no changes have occurred in the surrounding area, wherein the signals comprise reflected sunlight radiation or returned light or radiation of different wavelengths captured by the sensor; process the signals to determining environment data indicting varying phenomena in the environment, wherein the varying phenomena in the environment comprise changes in the physical characteristics of the target area and an amount of radiation captured by the RS data; and provide the environment data for display via a user device.

18 Claims, 13 Drawing Sheets

(51) Int. Cl.
    G06V 10/75      (2022.01)
    G06V 10/762     (2022.01)
    G06V 20/10      (2022.01)
    G06V 20/13      (2022.01)
    H04N 7/18       (2006.01)
    H04N 23/11      (2023.01)
(52) U.S. Cl.
    CPC ............ *G06V 10/762* (2022.01); *G06V 20/13* (2022.01); *G06V 20/182* (2022.01); *H04N 7/181* (2013.01); *H04N 23/11* (2023.01)

(56) References Cited

U.S. PATENT DOCUMENTS

| | | | | |
|---|---|---|---|---|
| 2004/0199410 | A1* | 10/2004 | Feyen | G06Q 40/08 705/4 |
| 2012/0053917 | A1* | 3/2012 | McHenry | G06F 30/20 703/9 |
| 2013/0286377 | A1* | 10/2013 | Heege | G01S 17/46 356/4.07 |
| 2015/0294154 | A1* | 10/2015 | Sant | G06V 20/182 382/110 |
| 2016/0047099 | A1* | 2/2016 | Zhang | G06Q 10/04 703/9 |
| 2017/0277815 | A1* | 9/2017 | Lorang | G01S 15/86 |
| 2019/0354873 | A1* | 11/2019 | Pescarmona | G06N 3/02 |
| 2020/0410838 | A1* | 12/2020 | Ishikawa | G06V 10/751 |
| 2021/0149929 | A1* | 5/2021 | Shen | G06N 20/00 |
| 2022/0156636 | A1* | 5/2022 | Albrecht | G01C 13/002 |
| 2024/0345287 | A1* | 10/2024 | Kurihara | G01W 1/00 |
| 2025/0024773 | A1* | 1/2025 | Han | E02B 13/02 |

OTHER PUBLICATIONS

Aragon, B., et al. (2018), "Cubesats enable high spatiotemporal retrievals of crop-water use for precision agriculture", Remote Sensing, MDPI AG, vol. 10 No. 12, 1867 (22 pages).
Arthur, D., et al. 2007. K-means++: the advantages of careful seeding. In Proceedings of the eighteenth annual ACM-SIAM symposium on Discrete algorithms (SODA '07). Society for Industrial and Applied Mathematics, USA, 1027-1035.
Busch, M.H., et al. (2020), "What's in a name? Patterns, trends, and suggestions for defining non-perennial rivers and streams", Water (Switzerland), MDPI AG, vol. 12 No. 7, p. 1980.
Campos, J.C., et al. 2012. Normalized difference water indexes have dissimilar performances in detecting seasonal and permanent water in the Sahara-Sahel transition zone. Journal of Hydrology. 464-465: 438-446.
Clean Water Act (CWA). 1972. Federal Water Pollution Control Act Amendments of 1972. Oct. 18, 1972 (88 pages).
Cooley, S.W., et al. (2019), "Arctic-Boreal Lake Dynamics Revealed Using CubeSat Imagery", Geophysical Research Letters, John Wiley & Sons, Ltd, vol. 46 No. 4, pp. 2111-2120.
Cooley, S.W., et al. (2017), "Tracking dynamic northern surface water changes with high-frequency planet CubeSat magery", Remote Sensing, vol. 9 No. 12, 1306 (21 pages).
Datry, T., et al. (2018), "A global analysis of terrestrial plant litter dynamics in non-perennial waterways", Nature Geoscience, Nature Publishing Group, vol. 11 No. 7, pp. 497-503.
Datry, T., et al. (2017), "Science and Management of Intermittent Rivers and Ephemeral Streams (SMIRES)", Research Ideas and Outcomes, Pensoft Publishers, vol. 3, p. e21774.
Fesenmyer, K.A., et al. (2021), "Large portion of USA streams lose protection with new interpretation of clean water act", Freshwater Science, The University of Chicago PressChicago, IL, vol. 40 No. 1, pp. 252-258.
Granato, G.E. (2010), "Methods for development of planning-level estimates of stormflow at unmonitored sites in the conterminous United States", Federal Highway Administration, available at: http://pubs.er.usgs.gov/publication/70057788 (accessed Jul. 27, 2021) (101 pages).
Hammond, J.C., et al. (2021), "Spatial Patterns and Drivers of Nonperennial Flow Regimes in the Contiguous United States", Geophysical Research Letters, vol. 48 No. 2 (11 pages).
Junqueira, A.M., et al. (2021), "Estimation of river flow using CubeSats remote sensing", Science of the Total Environment, Elsevier, vol. 788, p. 147762.
Kääb, A., et al. (2019), "River-ice and water velocities using the Planet optical cubesat constellation", Hydrology and Earth System Sciences, vol. 23 No. 10, pp. 4233-4247.
Levick, L., et al. 2008. The Ecological and Hydrological Significance of Ephemeral and Intermittent Streams in the Arid and Semi-arid American Southwest. U.S. Environmental Protection Agency and USDA/ARS Southwest Watershed Research Center, EPA/600/R-08/134, ARS/233046, 116 pp.
Loïc Messager, M., et al. (2021), "Global prevalence of non-perennial rivers and streams", Nature, vol. 594, p. 391.
Mishra, V., et al. (2020), "Evaluating the performance of high-resolution satellite imagery in detecting ephemeral water bodies over West Africa", International Journal of Applied Earth Observation and Geoinformation, Elsevier, vol. 93, p. 102218.
Mohammadi, A., et al. 2017. Application of time series of remotely sensed normalized difference water, vegetation and moisture indices in characterizing flood dynamics in large-scale arid zone floodplains. Remote Sensing of Environment. 190: 70-82.
Mott Lacroix, K.E., et al. 2016. Desert Flows Assessment: Environmental Water Needs of Riparian and Aquatic Ecosystems the Desert Watersheds of the United States and Mexico. Desert Landscape Conservation Cooperative, 218 pp.
Panda, S.K., et al. (2020), "Mapping of Shallow-Water Sites to Aid Navigation on the Colville River, North Slope of Alaska", International Geoscience and Remote Sensing Symposium (IGARSS), Institute of Electrical and Electronics Engineers Inc., pp. 4735-4737.
Poff, N.L., et al. 1997. The natural flow regime. BioScience. 47(11): 769-784.
Shanafield, M., et al. (2021), "An overview of the hydrology of nonperennial rivers and streams", Wiley Interdisciplinary Reviews: Water, John Wiley and Sons Inc, vol. 8 No. 2, p. e1504.
Shugar, D.H., et al. (2021), "A massive rock and ice avalanche caused the 2021 disaster at Chamoli, Indian Himalaya", Science, American Association for the Advancement of Science, p. eabh4455.
Skoulikidis, N.T., et al. (2017), "Non-perennial Mediterranean rivers in Europe: Status, pressures, and challenges for research and management", Science of the Total Environment, Elsevier, vol. 577, pp. 1-18.
Stromberg, J.C., et al. 2009. Ephemeral wetlands along a spatially intermittent river. Wetlands. 29(1): 330-342.
Sullivan, S.M.P., et al. 2019. The proposed change to the definition of "waters of the United States" flouts sound science. Proceedings of the National Academy of Science. 116(24): 11558-11561.
United Nations (UN). 1997. Convention to Combat Desertification. http://www.un.org/ecosocdev/geninfo/sustdev/desert.htm. Version accessed Aug. 20, 2014 (9 pages).
Vanhellemont, Q. 2019. Daily metre-scale mapping of water turbidity using CubeSat imagery. Optics Express. 27(20): A1372-A1399.
Vivoni, E.R., et al. (2020), "Abiotic Mechanisms Drive Enhanced Evaporative Losses under Urban Oasis Conditions", Geophysical Research Letters, John Wiley & Sons, Ltd, vol. 47 No. 22 (10 pages).
Walsh, R. et al. (2019), "Redefining Clean Water Regulations Reduces Protections for Wetlands and Jurisdictional Uncertainty", Frontiers in Water, Frontiers, vol. 1, p. 1 (6 pages).
Young, D.S., et al. 2015. Image analysis techniques to estimate river discharge using time-lapse cameras in remote locations. Computers & Geosciences. 76: 1-10.
Dingman, S.L. 2014. Physical Hydrology—Third Edition. Waveland Press, 643 pp.
Bormann, K. J., et al. (2018). Estimating snow-cover trends from space. Nature Climate Change, 8(11), 924-928.

(56) References Cited

OTHER PUBLICATIONS

Broxton, P. D., et al. (2020). Forest cover and topography regulate the thin, ephemeral snowpacks of the semiarid Southwest United States. Ecohydrology, 13(4), e2202.

Cannistra, A. F., et al. (2021). High-resolution CubeSat imagery and machine learning for detailed snow-covered area. Remote Sensing of Environment, 258, 112399.

Cayan, D. R. (1996). Interannual climate variability and snowpack in the western United States. Journal of Climate, 9(5), 928-948.

Cederstrom, C. J., et al. (2024). forest treatment effects on watershed responses under warming. Water Resources Research, 60(6), e2023WR035627.

Clark, M. P., et al. (2011). Representing spatial variability of snow water equivalent in hydrologic and land-surface models: A review. Water Resources Research, 47(7).

Dressler, K. A., et al. (2006). A comparison of snow telemetry and snow course measurements in the Colorado River basin. Journal of Hydrometeorology, 7(4), 705-712.

Dwivedi, R., et al. (2023). Snowtography quantifies effects of forest cover on net water input to soil at sites with ephemeral or stable seasonal snowpack in Arizona, USA. Ecohydrology, 16(2), e2494.

Dwivedi, R., et al. (2024). How three-dimensional forest structure regulates the amount and timing of snowmelt across a climatic gradient of snow persistence. Frontiers in Water, 6.

Fleming, S. W., et al. (2023). SNOTEL the soil climate analysis network, and water supply forecasting at the natural resources conservation service: Past, present, and future. JAWRA Journal of the American Water Resources Association, 59(4), 585-599.

Geissler, J., et al. (2023). Combining daily sensor observations and spatial lidar data for mapping snow water equivalent in a sub-alpine forest. Water Resources Research, 59(9), e2023WR034460.

Hammond, J. C., et al. (2018). Global snow zone maps and trends in snow persistence 2001-2016. International Journal of Climatology, 38(12), 4369-4383.

Han, J., et al. (2024). Streamflow seasonality in a snow-dwindling world. Nature, 629(8014), 1075-1081.

Harpold, A., et al. (2012). Changes in snowpack accumulation and ablation in the intermountain west. Water Resources Research, 48(11).

Hawkins, G. A., et al. (2015). A climate change projection for summer hydrologic conditions in a semiarid watershed of central Arizona. Journal of Arid Environments, 118, 9-20.

Herbert, J. N., et al. (2024). Reanalyzing the spatial representativeness of snow depth at automated monitoring stations using airborne lidar data. The Cryosphere, 18(8), 3495-3512.

Houborg, R., et al. (2016). High-Resolution NDVI from planet's constellation of earth observing nano-satellites: A new data source for precision agriculture. Remote Sensing, 8(9), 768.

Jennewein, D. M., et al. (2023). The Sol Supercomputer at Arizona State University. Practice and Experience in Advanced Research Computing. 296-301.

Johnston, J., et al. (2024). Global snow seasonality regimes from satellite records of snow cover. Journal of Hydrometeorology, 25(1), 65-88.

Karanja, J., et al. (2023). Southwest US winter precipitation variability: Reviewing the role of oceanic teleconnections. Environmental Research Letters, 18(5), 053003.

Kiewiet, L., et al. (2022). Effects of spatial and temporal variability in surface water inputs on streamflow generation and cessation in the rain-snow transition zone. Hydrology and Earth System Sciences, 26(10), 2779-2796.

Klos, P. Z., et al. (2014). Extent of the rain-snow transition zone in the western U.S. under historic and projected climate. Geophysical Research Letters, 41(13), 4560-4568.

Knox, J. A., et al. (2017). Two simple and accurate approximations for wet-bulb temperature in moist conditions, with forecasting applications. Bulletin of the American Meteorological Society, 98(9), 1897-1906.

Kostadinov, T. S., et al. (2019). Watershed-scale mapping of fractional snow cover under conifer forest canopy using lidar. Remote Sensing of Environment, 222, 34-49.

López-Moreno, J. I., et al. (2024). Marginal snowpacks: The basis for a global definition and existing research needs. Earth-Science Reviews, 252, 104751.

Molotch, N. P., et al. (2005). Scaling snow observations from the point to the grid element: Implications for observation network design. Water Resources Research, 41(11).

Molotch, N. P., et al. (2006). SNOTEL representativeness in the Rio Grande headwaters on the basis of physiographics and remotely sensed snow cover persistence. Hydrological Processes, 20(4), 723-739.

Moore, C., et al. (2015). A GIS-based method for defining snow zones: Application to the western United States. Geocarto International, 30(1), 62-81.

Petersky, R. S., et al. (2019). The sensitivity of snow ephemerality to warming climate across an arid to montane vegetation gradient. Ecohydrology, 12(2), e2060.

Petersky, R., et al. (2018). Now you see it, now you don't: A case study of ephemeral snowpacks and soil moisture response in the Great Basin, USA. Hydrology and Earth System Sciences, 22(9), 4891-4906.

Planet Labs. (2024). Planet application program interface. In Space for Life on Earth. Planet Labs. Retrieved from https://api.planet.com.

Shulgina, T., et al. (2023). Observed and projected changes in snow accumulation and snowline in California's snowy mountains. Climate Dynamics, 61(9), 4809-4824.

Siirila-Woodburn, E. R., et al. (2021). A low-to-no snow future and its impacts on water resources in the western United States. Nature Reviews Earth & Environment, 2(11), 800-819.

Slatyer, R. A., et al. (2022). Ecological responses to variation in seasonal snow cover. Conservation Biology, 36(1), e13727.

Svoma, B. M. (2011a). El Niño-Southern Oscillation and snow level in the western United States. Journal of Geophysical Research: Atmospheres, 116(D24).

Svoma, B. M. (2011b). Trends in snow level elevation in the mountains of central Arizona. International Journal of Climatology, 31(1), 87-94.

Thaler, E. A., et al. (2023). Estimating snow cover from high-resolution satellite imagery by thresholding blue wavelengths. Remote Sensing of Environment, 285, 113403.

Tolan, J., et al. (2024). Very high resolution canopy height maps from RGB imagery using self-supervised vision transformer and convolutional decoder trained on aerial lidar. Remote Sensing of Environment, 300, 113888.

UDM 2.1. (2024). Retrieved Oct. 17, 2024, from https://developers.planet.com/docs/data/udm-2.

Wang, Y. H., et al. (2019). A wet-bulb temperature-based rain-snow partitioning scheme improves snowpack prediction over the drier western United States. Geophysical Research Letters, 46(23), 13825-13835.

Wang, Z., et al. (2022). Detecting streamflow in dryland rivers using CubeSats. Geophysical Research Letters, 49 (15), e2022GL098729.

Winstral, A., et al. (2014). Long-term snow distribution observations in a mountain catchment: Assessing variability, time stability, and the representativeness of an index site. Water Resources Research, 50(1), 293-305.

Yang, K., et al. (2023). High-resolution mapping of snow cover in montane meadows and forests using Planet imagery and machine learning. Frontiers in Water, 5.

Zhang, T. (2005). Influence of the seasonal snow cover on the ground thermal regime: An overview. Reviews of Geophysics, 43(4).

Dewalle, D. R., et al. (2008). Principles of Snow Hydrology. Cambridge University Press.

\* cited by examiner

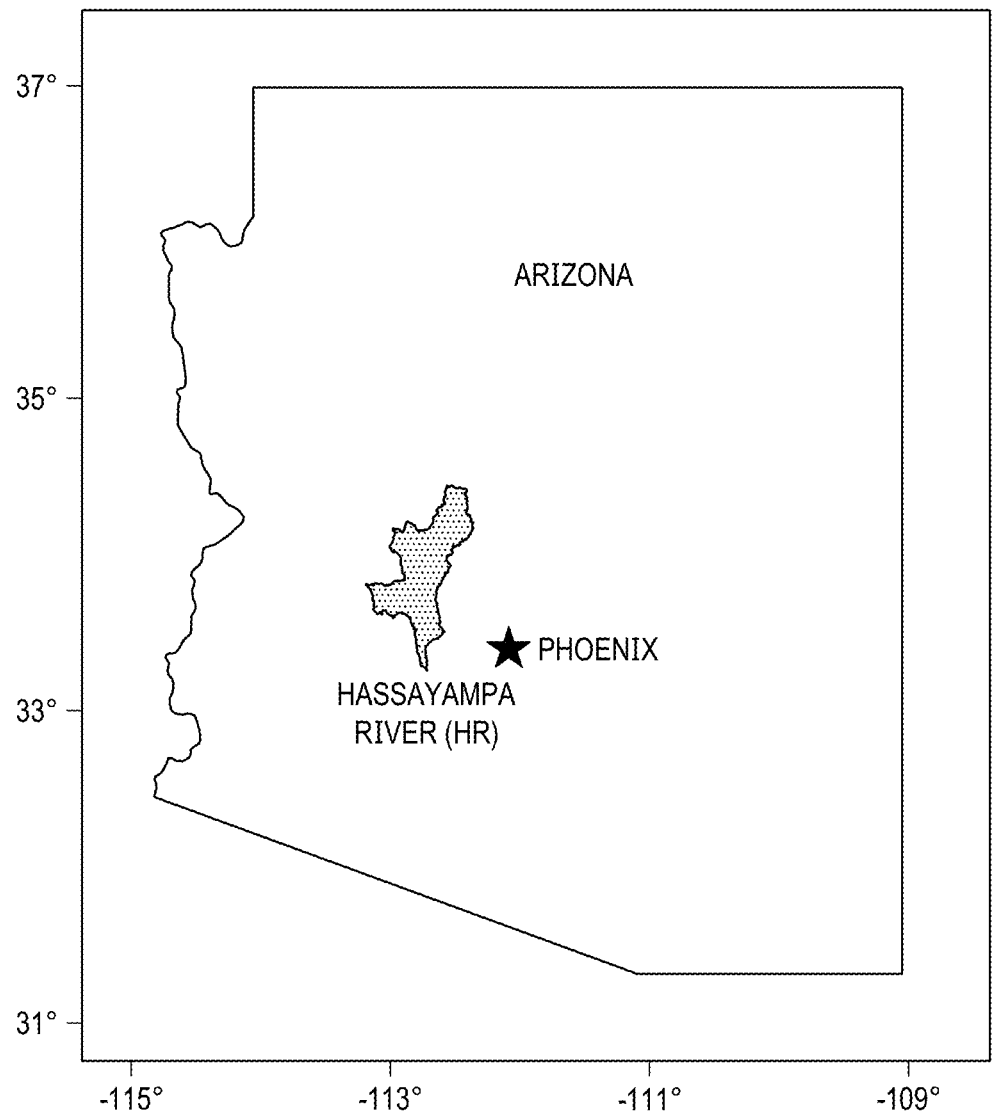

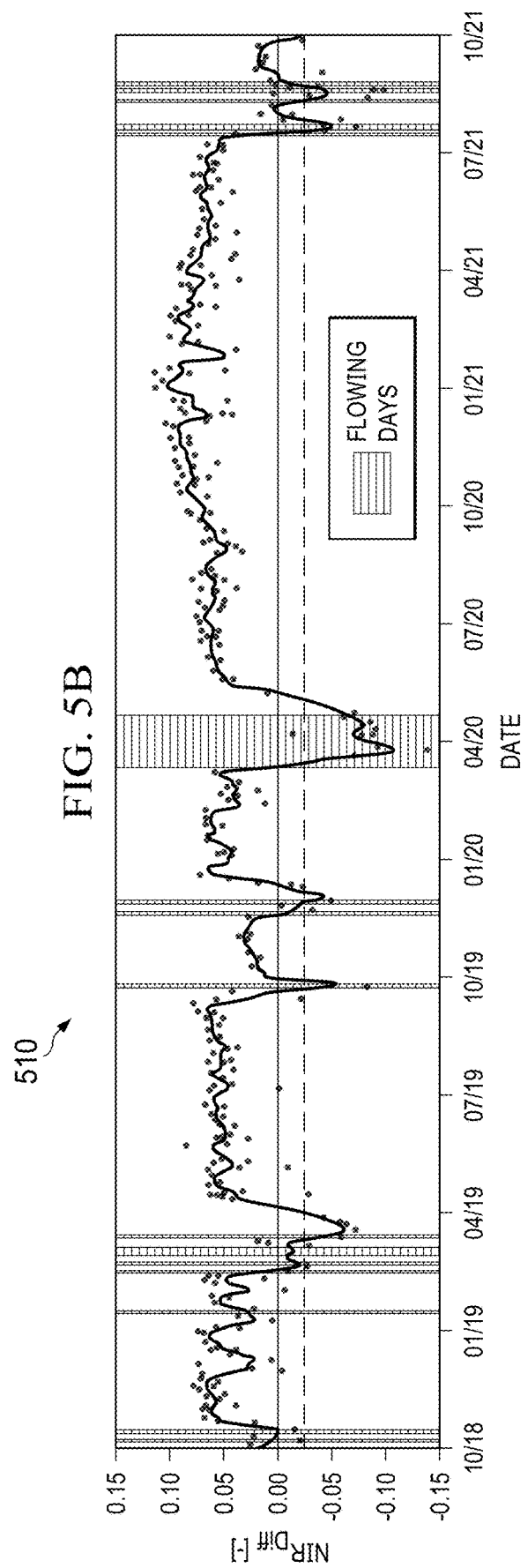

SYSTEM FOR DETERMINING STREAMFLOW DURATION FROM REMOTELY-SENSED IMAGERY

CROSS-REFERENCE TO RELATED APPLICATIONS

This application claims priority to U.S. Provisional Patent Application No. 63/305,975, filed on Feb. 2, 2022, which is incorporated by reference herein in its entirety.

FEDERALLY SPONSORED RESEARCH

This invention was made with government support under 80NSSC21K1154 awarded by the National Aeronautical & Space Administration. The government has certain rights in the invention.

BACKGROUND

Determining the streamflow regime of rivers is important for regulatory purposes and resource management. Traditional methods for assessing the flow status in river reaches depend on field inspections and on-the-ground sensors.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 1A depicts an example study region that includes the location of the Hassayampa River (HR) watershed in central Arizona.

FIG. 5B depicts the difference in the surface reflectance of NIR between the channel and outside areas (NIR-DIFF).

DETAILED DESCRIPTION

Figure 1B:
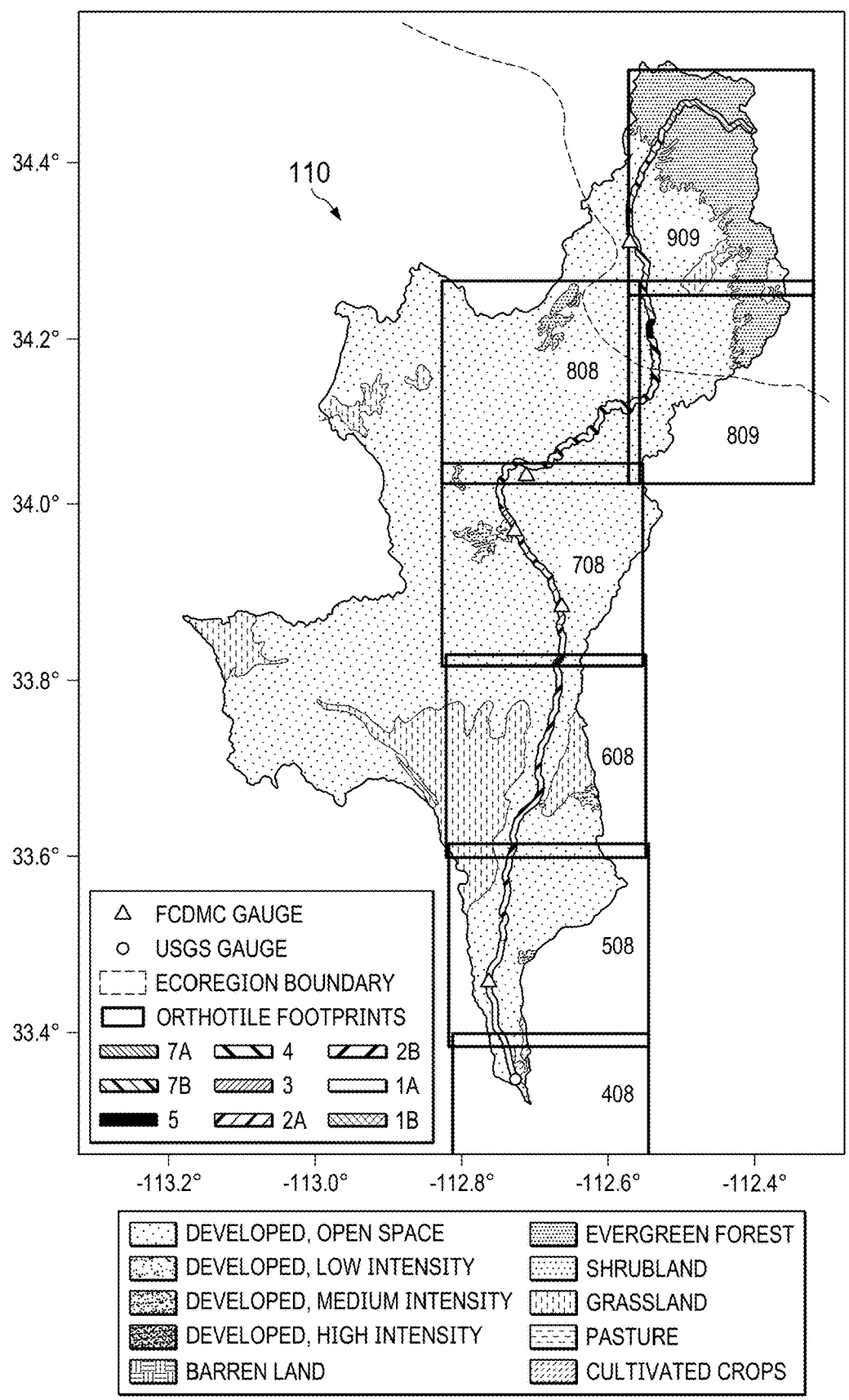
FIG. 1B shows the land cover types with subreaches along the HR and streamflow gauges.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

Embodiments of the present disclosure are generally directed to systems and methods for determining varying phenomena (e.g., changes) from remote sensing (RS) imagery by comparing signals (e.g., captured via RS imagery) between target areas where changes occur and surrounding areas where no changes occur.

In some embodiments, the changes are determined by contrasting signals between those two areas allow the detection of changes. For example, the presence of water inside the channel mask leads to a large difference in the near infrared band reflectance as compared to areas outside of a channel where flow did not occur. In addition to water presence, the systems and methods presented herein can be used to detect other rapidly changing phenomena captured by RS imagery such as monitoring and mapping agriculture, forestry, grazing, infrastructure, natural hazards, and maritime and coastal areas.

In an example embodiment, a system is employed to determine a streamflow presence in a river based on remote sensing indexes (including surface reflectance of Near Infrared NIR and other indexes derived from NIR). In some embodiments, the streamflow presence is determined using a sequence of remote sensing data of the river collected by satellites. In some embodiments, river reach segments for the river as a respective rectangular buffer for each segment are generated from the existing river data. In some embodiments, a channel mask is determined by calculating changes in remote sensing indexes between flood and dry conditions and applying a clustering algorithm. In some embodiments, the streamflow presence is then determined based on the differences in remote sensing indexes between inside and outside the channel for each of the river reach segments and the threshold derived from streamflow gauge observations.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. The term "approximately" as used herein refers to any values, including both integers and fractional components that are within a variation of up to +10% of the value modified by the term "about." In certain aspects, the term "approximately" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Alternatively, "approximately" can mean within 3 or more than 3 standard deviations, per the practice in the art. Alternatively, such as with respect to biological systems or processes, the term "about" can mean within an order of magnitude, in some embodiments within 5-fold, and in some embodiments within 2-fold, of a value.

As used herein "streamflow presence" includes the temporal presence of flowing water in a river reach.

As used herein "phenomena" includes radiation that is emitted or reflected by the object or surrounding areas.

As used herein "signals" include radiation that is emitted or reflected by the object or surrounding areas.

Overview

Described herein is a systems and methods for determining varying phenomena from RS imagery by comparing signals between target areas where changes occur and surrounding areas where no changes occur. The example system is described herein in the connect of identifying the streamflow presence in a river system. However, the described system can be employed in any number of similar systems. For example, in agriculture, planted areas have different surface reflectance (SR) from fallowed areas. Moreover, crops also have time-varying SR responses at different growth stages. By comparing planted areas and fallowed areas, the described system can be employed to map the growing status of given farms which is useful for tracking irrigation water use, monitoring crop health, and predicting yield.

In another example, for forestry and grazing management, areas generally have varying SR depending on forest species, density, season, and health. As such, the described system can be employed to detect rapid changes in forests, such as forest fire, thinning, and beetle disease, to inform forestry management. Similarly, pasture conditions can be monitored using to inform grazing management, such as designing rotation plans.

In another example, new infrastructures have different SR with surrounding areas and can be mapped using the system described here. Infrastructures examples include solar panels, drilling rigs, roads, pipelines, buildings, and the like.

In another example, severe natural hazards, such as hurricanes, tornados, flash floods, earthquakes, landslides, can drastically change the landscape. For example, flash floods can erode riverbanks, carry sediments from remote areas, and leave standing water in affected areas. By comparing affected areas with non-affected areas, the described system can be employed to map flash flood hazards and estimate affected areas.

In another example, water-going vessels, including fishing boat, cargo ships, and oil tankers, have different SR with the sea surface. Some of these also leave traces on the sea surface that can be captured by RS imagery. The described system can be employed to track movement of these vessels based on the difference in SR between the water-going vessels (or trace) and sea surface.

In another example, the described system is employed to identify the streamflow presence at high spatial and temporal resolution using remote sensing observations. In some embodiments, the described system relies on the high spatial and temporal resolution offered by a constellation of small satellites (CubeSats) that orbit the Earth. In some embodiments, the described system employs an algorithm to detect changes in remotely-sensed surface reflectance (SR) and other indexes derived from single band SR within a channel relative to conditions outside of these areas to identify when flow occurs. In some embodiments, the algorithm is trained using streamflow presence readings collected from gauging stations. In one embodiment, the described system determined number of days with flow at 90 meter (m) intervals along the example river that can be used to classify reaches as ephemeral or intermittent for environmental decision-making. Over the study period, the remote sensing analysis yielded an unprecedented level of spatial and temporal detail in the streamflow status as compared to traditional methods.

Streamflow Regime

The streamflow regime is a critical determinant of many ecological and hydrological processes and plays an important role for regulatory purposes. Three regime categories are often used to describe a river reach: perennial, intermittent, and ephemeral. Perennial rivers have water flow throughout the year, whereas intermittent and ephemeral reaches only flow during seasonal or storm periods, respectively. This distinction has important consequences for water resources management since the Clean Water Act (CWA, 1972) uses the streamflow regime characteristics for imposing regulations on pollutant discharges and maintaining water quality in rivers.

In arid and semiarid regions of the United States, which occupy 30% of the nation's area, the streamflow regime has a wide range of possible behaviors including perennial, intermittent, and ephemeral status. This determination has received recent attention due to on-going modifications to the CWA that consider the protection status of ephemeral rivers. Underlying this policy consideration is an important question: "Which rivers are ephemeral?". In recent years, high-resolution remote-sensing imagery have demonstrated great potential in detecting non-perennial reaches.

Accordingly, the described system may be employed to determine streamflow presence of an arid river system (e.g., the HR in central Arizona) using a sequence of high-resolution remote sensing data from a constellation of small satellites. The streamflow regime along the main stem of the HR has been of particular interest for a number of years. Current efforts to determine the streamflow status have included the use of streamflow gauging stations, ground-based cameras, field inspections following specified protocols, and citizen science reports. For instance, a recent study conducted a literature review of the field studies carried out to assess the streamflow regimes in the southwestern US. These are necessary since the availability of stream monitoring stations in the region is sparse. While useful, these techniques all share the limitations of having low spatiotemporal sampling and the potential for limited access to vast lengths of river reaches. As such, employment of the described system complements these efforts by providing information in regions that have been hard to access and across time periods that might not be covered through field-based activities. Furthermore, the system provides a robust solution that can be applied to other arid and semiarid rivers with relative ease and low cost as compared to traditional methods for determining streamflow presence.

Study Site and Observations

FIG. 1A depicts an example study region 100 that includes the location of the HR watershed in central Arizona. The HR is ~3766 square kilometers (km$^2$), in central Arizona, north and west of the Phoenix metropolitan area. The watershed was delineated by the U.S. Geological Survey (USGS) with an 8-digit HUC (Hydrologic Unit Code) of 15080103. The elevation ranges from 2430 m at the northern portion of the basin to 240 m where the HR has a confluence with the Gila River.

FIG. 1B shows the land cover types 110, from the National Land Cover Dataset (NLCD) 2019 product, with study reaches along the HR and streamflow gauges operated by the Flood Control District of Maricopa County (FCDMC) and U.S. Geological Survey (USGS). As depicted, the main stem of the HR has been divided into nine subreaches, denoted as 7A, 7B, 5, 4, 3, 2A, 2B, 1A, and 1B, and arranged in upstream to downstream order.

A summary of all gauges, including their names, abbreviations, agencies, IDs, covering periods, and locations, is provided in Table 1. These gauges were used to test the remote sensing method.

TABLE 1

Summary of streamflow gauges used in this study.

| Name | Abbreviation | Agency | ID | Elevation [m] | Precipitation [mm/year] |
|---|---|---|---|---|---|
| HR at Wagoner Road | WAR | FCDMC | 54307 | 1146 | 385 |
| HR at Box Canyon | BCN | FCDMC | 53507 | 684 | 412 |
| HR at US 60 | U60 | FCDMC | 45707 | 623 | 207 |
| HR near Morristown | MOR | FCDMC | 45507 | 558 | 297 |
| HR at I-10 | I10 | FCDMC | 48007 | 309 | 148 |
| HR near Arlington | ARL | USGS | 9517000 | 251 | 135 |

In one example, PlanetScope imagery were used to determine streamflow presence. PlanetScope data are acquired by a constellation of ~200 Cubesats (each measuring 10×10×30 cm) in low Earth orbit (altitude of ~500 km), with a near-daily imaging capability since 2017. PlanetScope imagery has four spectral bands (Red, Blue, Green, and Near Infrared or NIR) with a ground resolution of 3 m. The PlanetScope Ortho Tile product was employed, which were merged from radiometrically, sensor, and geometrically corrected PlanetScope images within each defined grid. The size of each tile is 25 km by 25 km, with 1 km of overlap with adjacent tiles. All available Planet imagery over the study period were used, except for those with cloud fractions greater than 20% for quality control purpose and those with local crossing time earlier than 10:00 A.M. to prevent confusion between water and terrain shadows. On average, there are approximately 253 usable images per year (or 69%) over the HR.

In the described example, Planet provides an Unusable Data Mask (UDM) product that labels the usable pixels (not affected by cloud cover or by a cloud shadow). For the usable Planet imagery, the pixels marked as cloudy, based on the UDM product, were excluded. The detailed fractions of usable imagery and clear pixels in usable imagery (within the buffer zone, described in next paragraph) are summarized in Table 2 below.

TABLE 2

Summary of usable imagery fractions and planet pixels for all Planet tiles.

| | Fraction of Usable Imagery | | | Fraction of Clear Pixels | | |
|---|---|---|---|---|---|---|
| Tile ID | WY 2019 | WY 2020 | WY 2021 | WY 2019 | WY 2020 | WY 2021 |
| 909 | 65.2% | 66.7% | 73.8% | 90.7% | 95.6% | 92.9% |
| 809 | 64.1% | 60.1% | 71.3% | 88.2% | 95.4% | 94.1% |
| 808 | 70.7% | 69.7% | 76.0% | 92.1% | 96.1% | 94.6% |
| 708 | 68.5% | 66.9% | 78.7% | 93.7% | 97.1% | 95.8% |
| 608 | 67.7% | 59.6% | 73.5% | 90.9% | 96.7% | 95.4% |
| 508 | 69.0% | 64.8% | 75.7% | 92.1% | 95.5% | 93.7% |
| 408 | 71.2% | 63.9% | 77.0% | 87.6% | 95.3% | 94.1% |

Streamflow Detections

Figure 2:
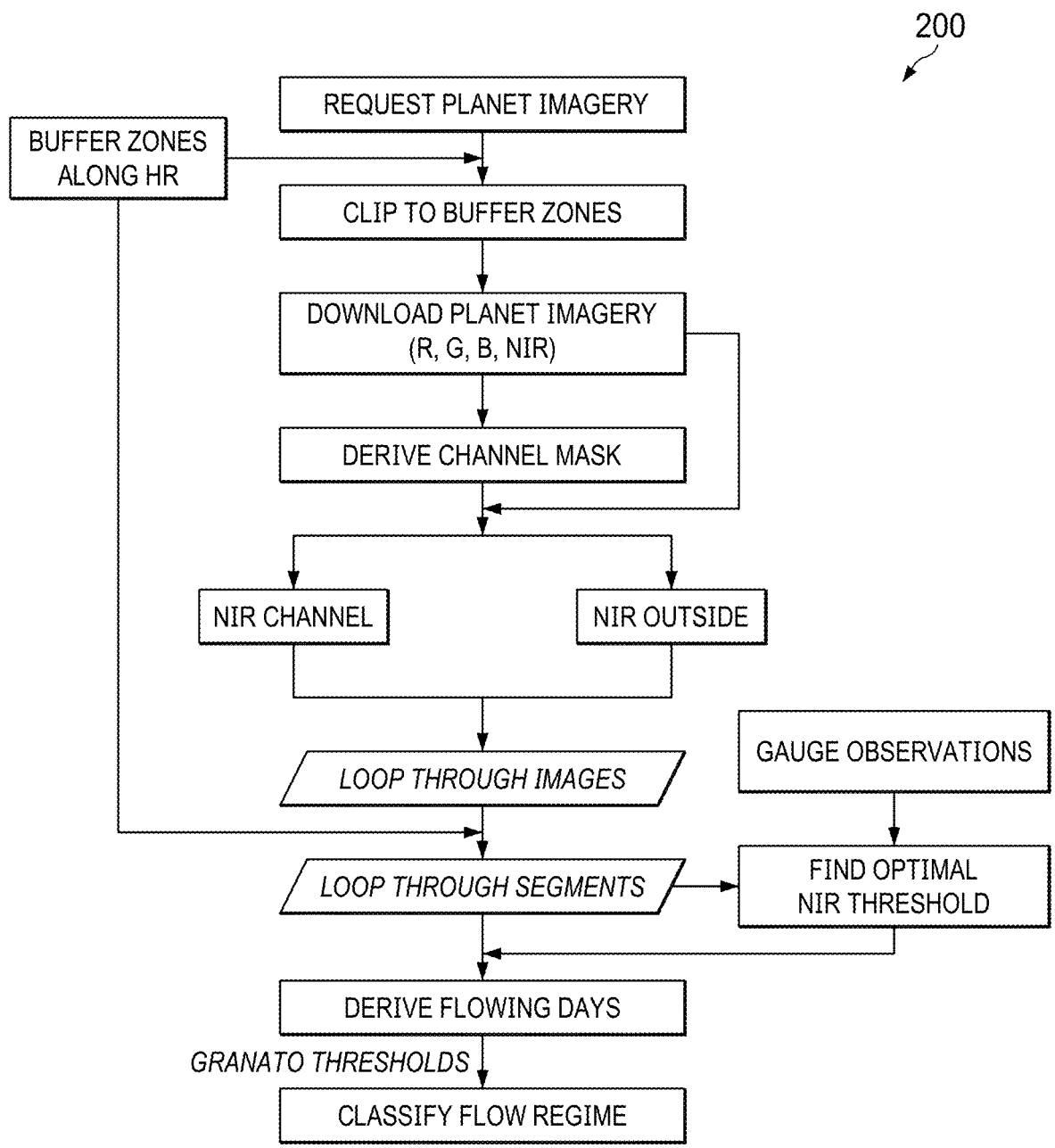
FIG. 2 depicts a flowchart of a remote sensing-based streamflow detection workflow.

FIG. 2 depicts a flowchart of process 200 for a remote sensing-based streamflow detection workflow. The streamflow detection method is based on robust differences in surface reflectance for locations inside and outside of a river reach. Different GIS layers were derived for use in the streamflow detection algorithm: channel mask and buffer zones along the river.

Figure 3:
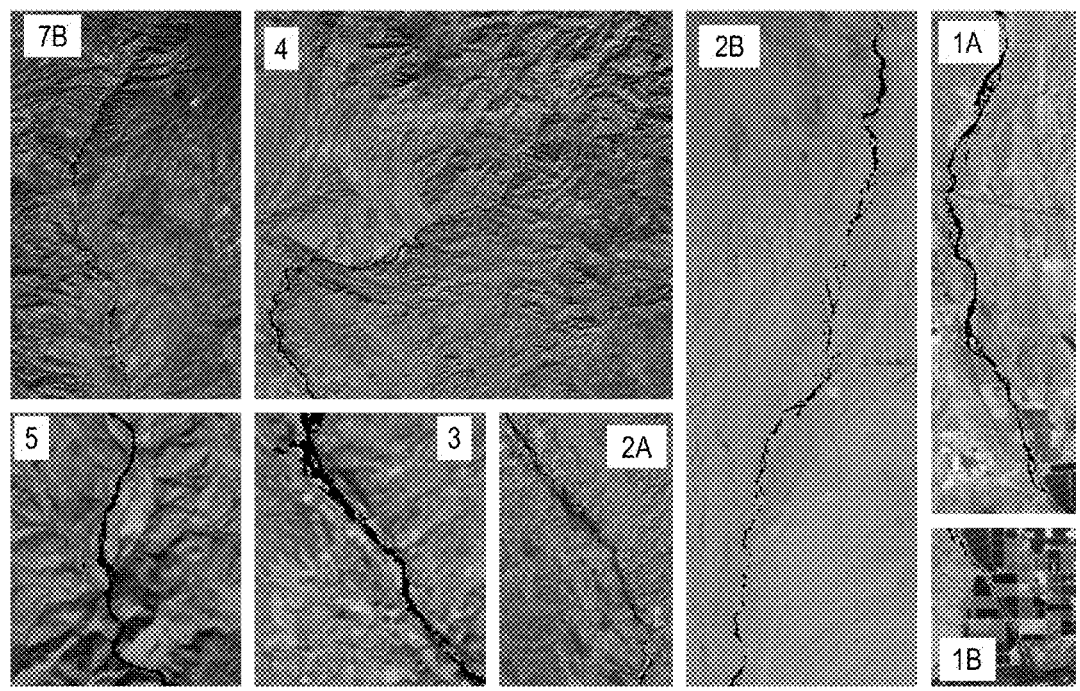
FIG. 3 depicts channel masks for the subreaches along the HR and the profile of the channel mask (or river) width arranged from upstream to downstream.
Figure 3:
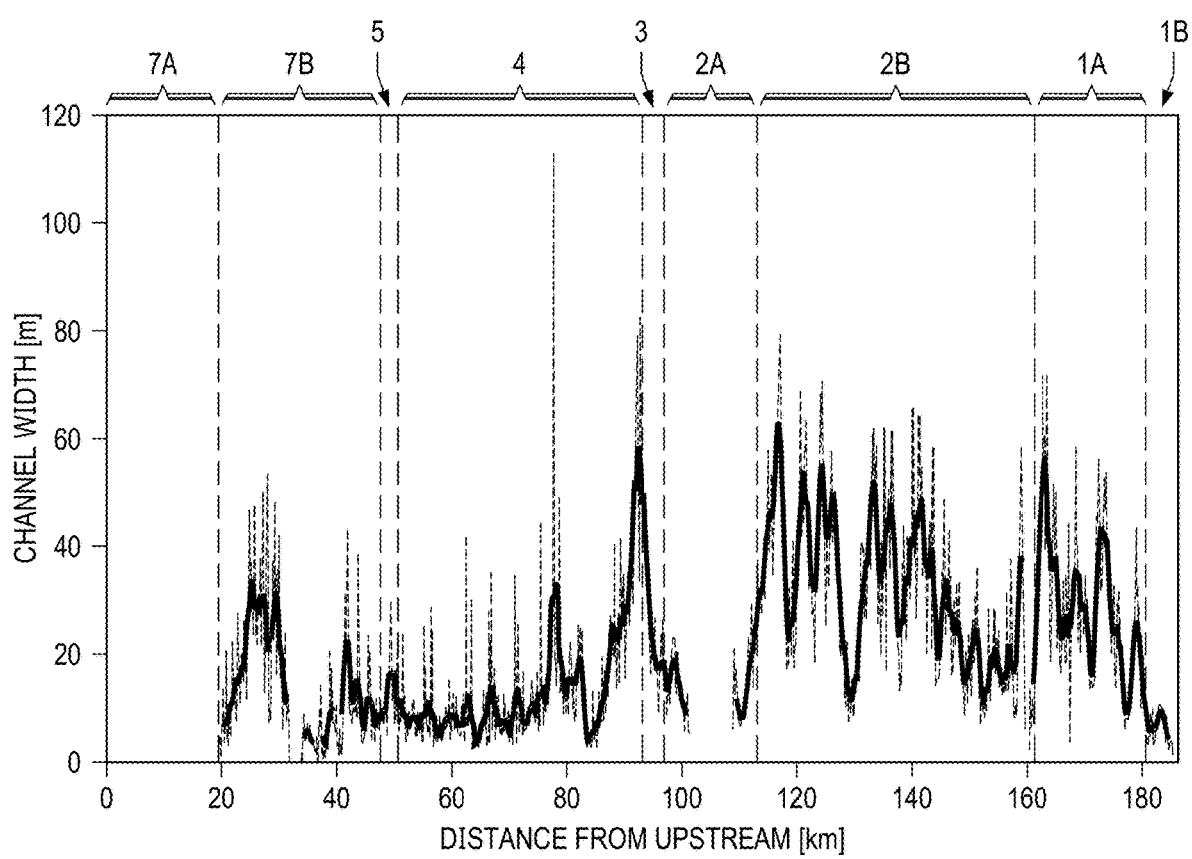
Figure 4A:
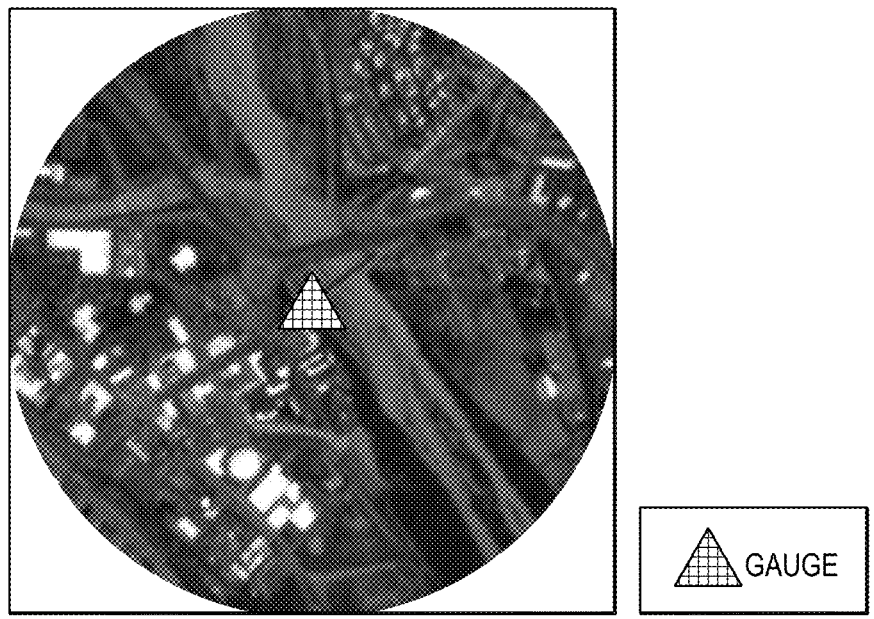
FIGS. 4A and 4B each depict a true color image of an example site under dry flowing conditions.
Figure 4B:
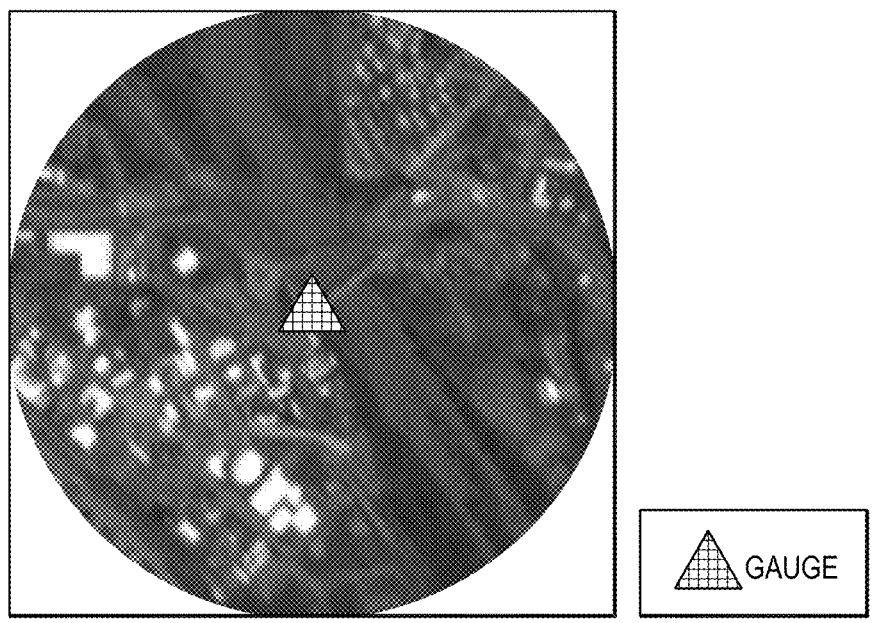

FIG. 3 depicts an example of a channel mask layer along the HR, with the variations of the channel mask (or river) width from upstream to downstream. The grey lines represent raw data and black lines represent smoothed results), with the extent of reaches marked with different colored backgrounds. The channel mask was derived based on the analysis of PlanetScope data for conditions prior to and during a major flood event in March 2020. This flood event was selected since it had the longest duration (20 days) and largest peak discharge (132 m3/s) over the study period based on the streamflow records at the MOR station (Table 1). The changes in the surface reflectance in NIR band (SRNIR) were calculated between dry (Mar. 7, 2020, FIG. 4A) and flood (Mar. 20, 2020, FIG. 4B) conditions and applied k-means clustering algorithm to extract the channel mask. Along the 186 km of the HR main stem, the k-means algorithm was able to identify the channel mask over 84% of the reaches. Channel extraction failed in regions where these are covered by riparian vegetation or too narrow to be distinguished from the surrounding areas. In addition, the k-means algorithm falsely classified a few pixels that have similar changes in NIR with channels (e.g., mining facilities, agricultural fields) before and during the flood event. Those pixels were removed using raster editing tools to finalize the channel mask.

Figure 4C:
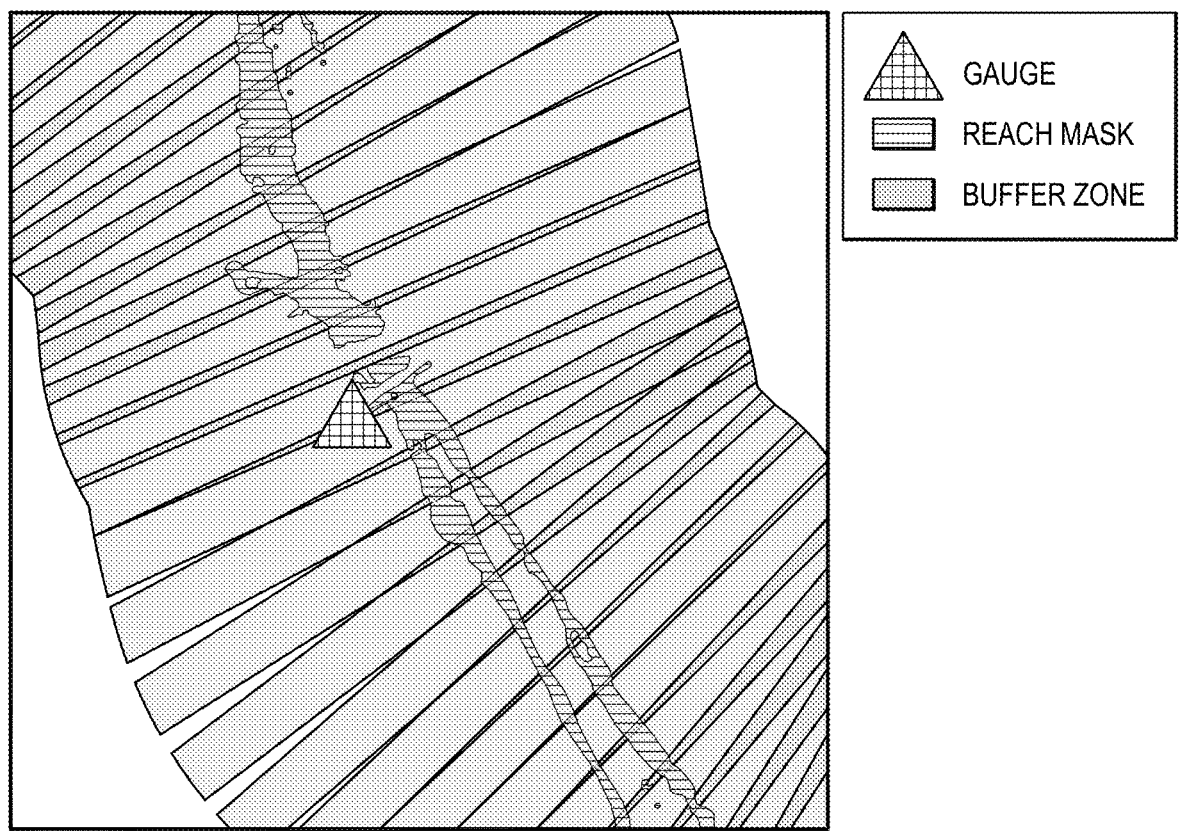
FIG. 4C depicts the reach mask and buffer zone around the example site.

In the example depicted in FIG. 3, river reach segments of 90 m in length along the HR were generated to sample the streamflow presence at high resolution. For each 90 m segment, a rectangular buffer was generated perpendicular to the river reach line to sample the immediate surroundings of each river segment. The width of the buffer was set as 500 m on each side, with some sections extending to 800 m with wider channel due to braided reaches. FIG. 4C depicts an example at the U60 site (gauge station shown in yellow triangular), with buffer areas shown in grey and channel mask in blue.

In the example depicted in FIG. 3, average surface reflectance values of NIR band for pixels inside (NIR-IN) and outside (NIR-OUT) for each segment used were calculated to detect the streamflow presence along the HR. To derive days with streamflow from PlanetScope data, the relationship between channel flowing conditions at streamflow gauge stations and SRNIR data over five of the buffer segments that were collocated with stations (Table 1) were explored. Flow days were determined based on the streamflow records when the measured discharge (Q) is positive (Q>0). The difference between NIR-IN and NIR-OUT, or NIR-DIFF, was used as an index to determine flowing conditions.

In the described example, different NIR-DIFF thresholds were tested iteratively to determine the optimal value, such that annual total flowing days derived from Planet imagery (NNIR) match with those from gauge records (NGauge). The buffer segments over HR were looped through to derive the days with flow based on the NIR-DIFF threshold. Thresholds of flowing days were used to classify the streamflow regime as ephemeral or intermittent. In the described example, the threshold used is 26 days for Reach 7A, 7B, and 5, and 13 days for the rest (4, 3, 2A, 2B, 1A, and 1B).

Streamflow Analysis at Stations

Figure 5A:
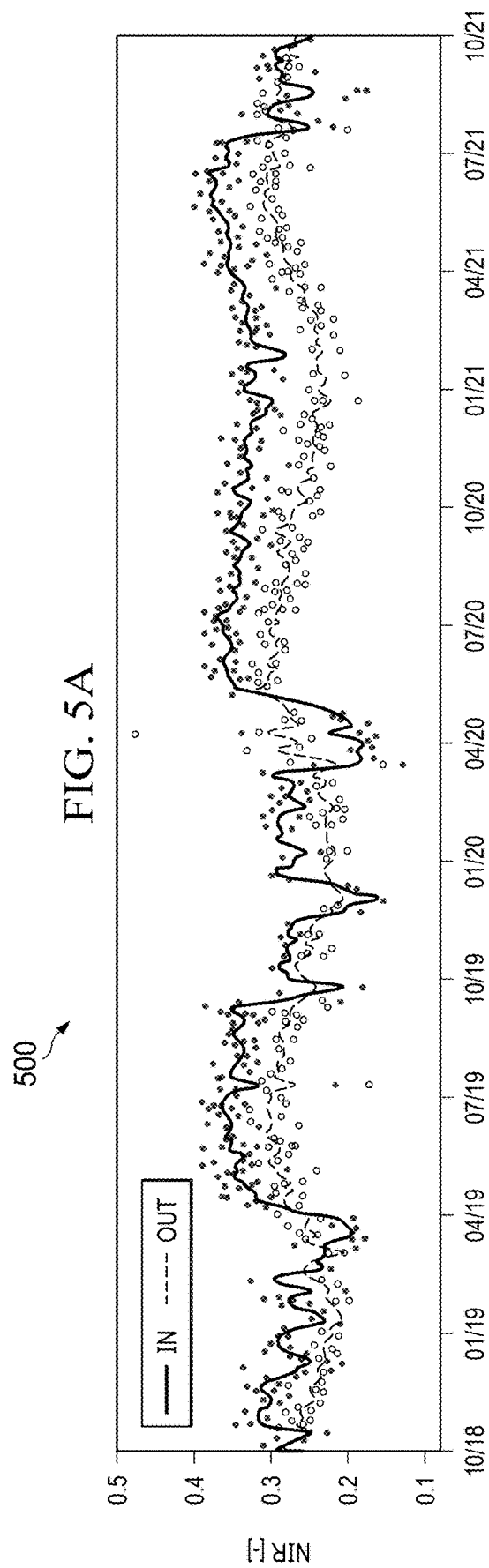
FIG. 5A depicts a chart showing time series of Near Infrared (NIR) surface reflectance inside and outside the reach mask within the buffer zone collocated with the streamflow gauge shown in FIGS. 4A-4C.

FIG. 5A depicts a chart 500 showing the time series of NIR surface reflectance inside and outside the reach mask within the buffer zone collocated with the streamflow gauge shown in FIG. 4 from WY 2019 to 2021. FIG. 5B depicts a chart 510 showing the difference in the surface reflectance of NIR between the channel and outside areas (NIR-DIFF). In one example, analyses were conducted at streamflow stations to understand the relationship between PlanetScope data and streamflow duration. The examples depicted in FIGS. 5A and 5B show an example at the U60 station.

In the depicted examples, PlanetScope data captured NIR differences between locations within and outside the channel reach due to water is a strong absorber. This is shown in the time series of NIR-IN and NIR-OUT (FIG. 5A). When the channel was dry, for example from May 2020 to June 2021 with no streamflow, NIR-IN was higher than NIR-OUT (0.34 and 0.27, respectively). Similar patterns also occurred during other dry periods (e.g., April to August 2019). Under the flood condition when flowing water was present, NIR-IN decreased significantly and crossed below the relatively stable NIR-OUT, resulting in a negative NIR-DIFF. As the flood gradually recessed from the channel, NIR-IN started to increase and eventually became larger than NIR-OUT, creating a second cross-over point. Lower values of NIR-DIFF suggest a higher possibility of water flowing in the channel, which makes NIR-DIFF a good indicator of flowing conditions.

In the described example, with confidence built on the performance of NIR-DIFF index, different values of thresholds in NIR-DIFF were iteratively tested to find the optimal one that yields similar days of flow from remote sensing imagery (NNIR) with stream gauge observations (NGauge). The duration of the cross-over period with NIR-DIFF≤−0.024 matched the flowing days obtained at the gauging station (blue shaded periods in FIG. 5B), such that the method is a robust way of determining streamflow presence, with $R^2=0.71$, $p<0.0001$, and Standard Error of Estimates (SEE) equals to 17.5 days.

Streamflow Analysis along the Hassayampa River

Figure 6:
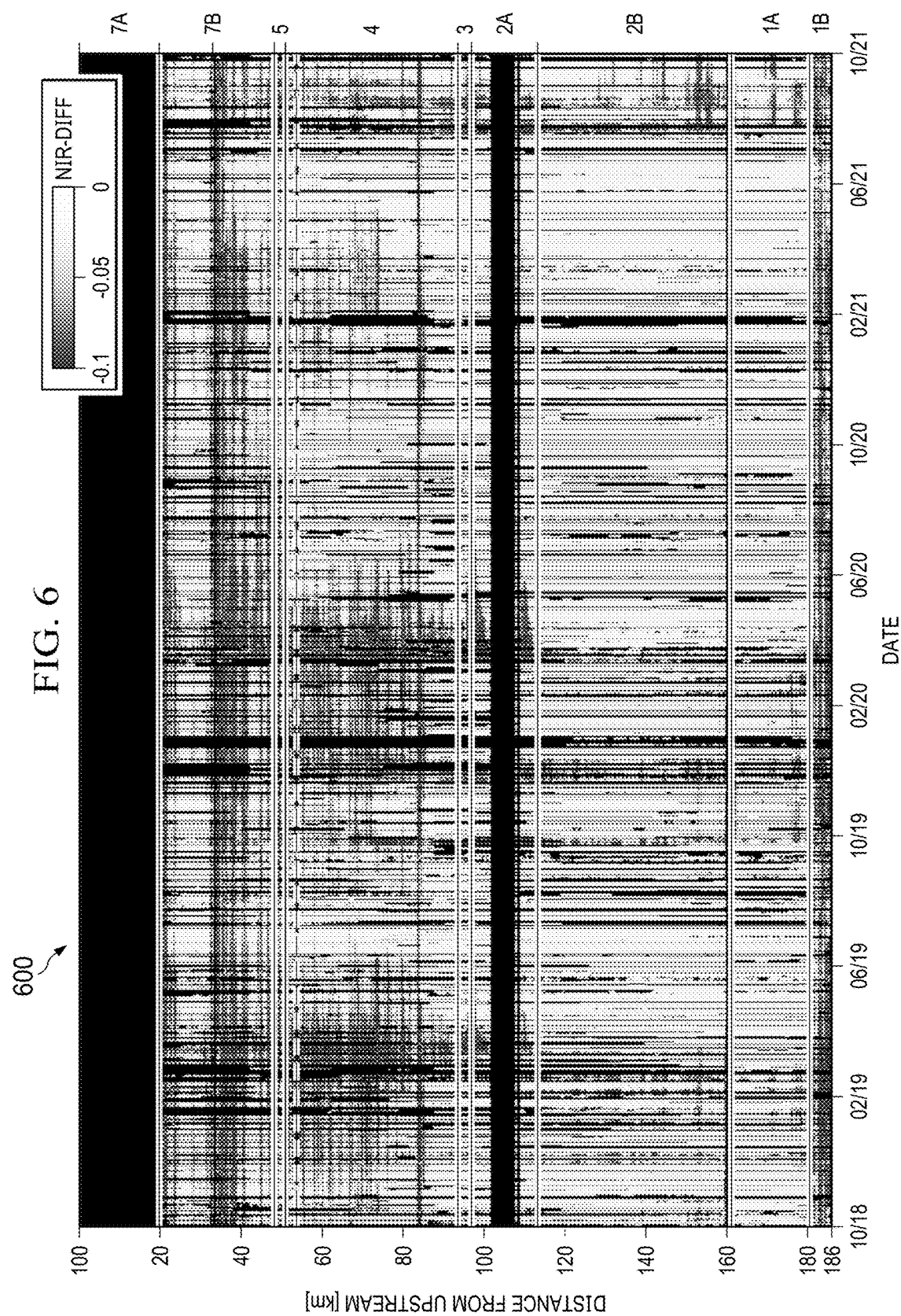
FIG. 6 depicts a chart showing the difference in the surface reflectance of NIR between the channel and outside areas (NIR-DIFF) in each buffer segment along the HR.

In one example, the described system was applied to the entire HR to determine the days with flow and the streamflow regime from WYs 2019-2021. FIG. 6 depicts a chart 600 showing the difference in the surface reflectance of NIR between the channel and outside areas (NIR-DIFF) in each buffer segment along the HR. The chart 600 includes a horizontal dimension showing how NIR-DIFF varies with time along the vertical dimension that represents the distance of HR. Each pixel represents the average NIR-DIFF of a 90 m buffer segment. Darker blue color (i.e., lower NIR-DIFF) suggests a higher probability of flowing condition. Pixels with no available data due to the lack of Planet data (vertical clusters) or visible channels (horizontal clusters) are shown in gray. The horizontal solid lines show the extent of sub reaches in the HR. From this analysis, the spatiotemporal distribution of the channel condition with flooding can be viewed over the entire length of the HR. The upper reaches (Reach 7B, 5, 4, and 3) have more days with flow than the lower elevation reaches (Reach 2B and 1A). Reach 1B also has a higher probability of more flowing days since it receives return flows from agricultural fields in Buckeye. The chart 600 also shows that flood events usually have a longer duration and greater spatial coverage in spring and winter seasons than in the summer.

In the described example, the NIR-DIFF threshold was used to determine the days with flow along the HR. The results of annual total days with flow from 2017-2020 are summarized in Table 3 (below).

TABLE 3

Number of flowing days and intermittent fraction (in % within parentheses) in HR reaches for each water year (WY), with the average over the three WYs.

| Reach ID | Length (km) | Number of Flowing Days (Intermittent Fraction) | | | |
|---|---|---|---|---|---|
| | | WY 2019 | WY 2020 | WY 2021 | Average |
| 7A | 18 | — | — | — | — |
| 7B | 32 | 20 (20%) | 20 (20%) | 31 (30%) | 24 (25%) |
| 5 | 3 | 19 (21%) | 19 (21%) | 29 (36%) | 22 (24%) |
| 4 | 47 | 22 (45%) | 22 (45%) | 24 (41%) | 22 (45%) |
| 3 | 3 | 12 (34%) | 12 (34%) | 15 (41%) | 13 (37%) |
| 2A | 15 | 10 (23%) | 10 (23%) | 17 (55%) | 12 (36%) |
| 2B | 45 | 2 (1%) | 2 (1%) | 1 (1%) | 2 (1%) |
| 1A | 18 | 2 (0%) | 2 (0%) | 2 (1%) | 2 (1%) |
| 1B | 5 | 67 (75%) | 67 (75%) | 70 (75%) | 68 (76%) |

Figure 7:
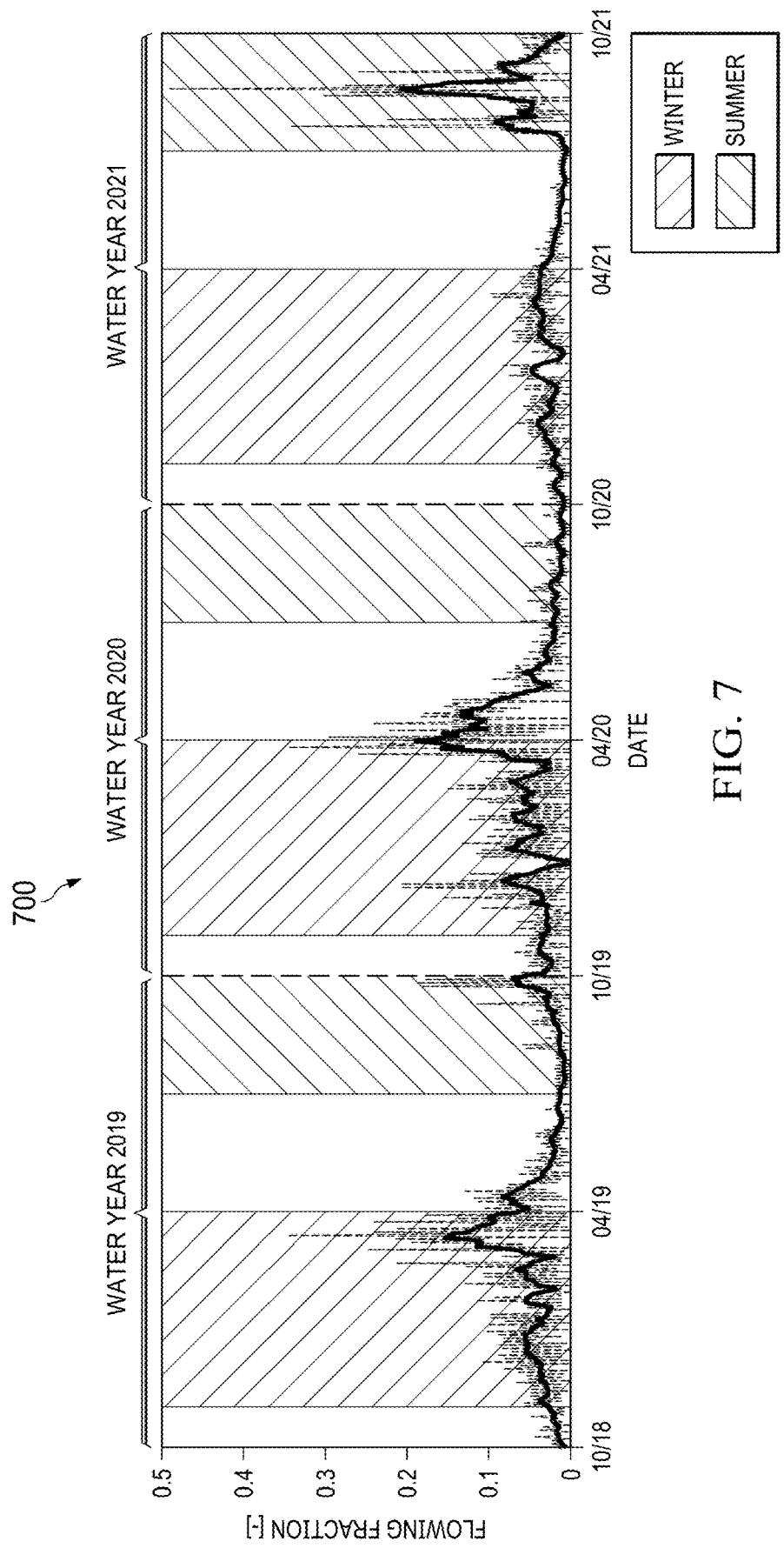
FIG. 7 depicts a chart that shows the average daily flowing fraction in the HR.

FIG. 7 depicts a chart 700 showing the temporal variations of streamflow presence with the daily flowing fraction, calculated as the fraction of the river with streamflow presence in the reach mask. Low FF (average of 4.8% and standard deviation of 5.4%) indicated that HR was non-perennial overall but had strong seasonal variations. FF values of winters were usually higher than summers, except for WY 2021 when summer storms led to streamflow presence in many reaches (e.g., FF=30% and 49% on Aug. 14 and 18, 2021). For the described example, winter is defined as November to March and summer as July to September.

Figure 8:
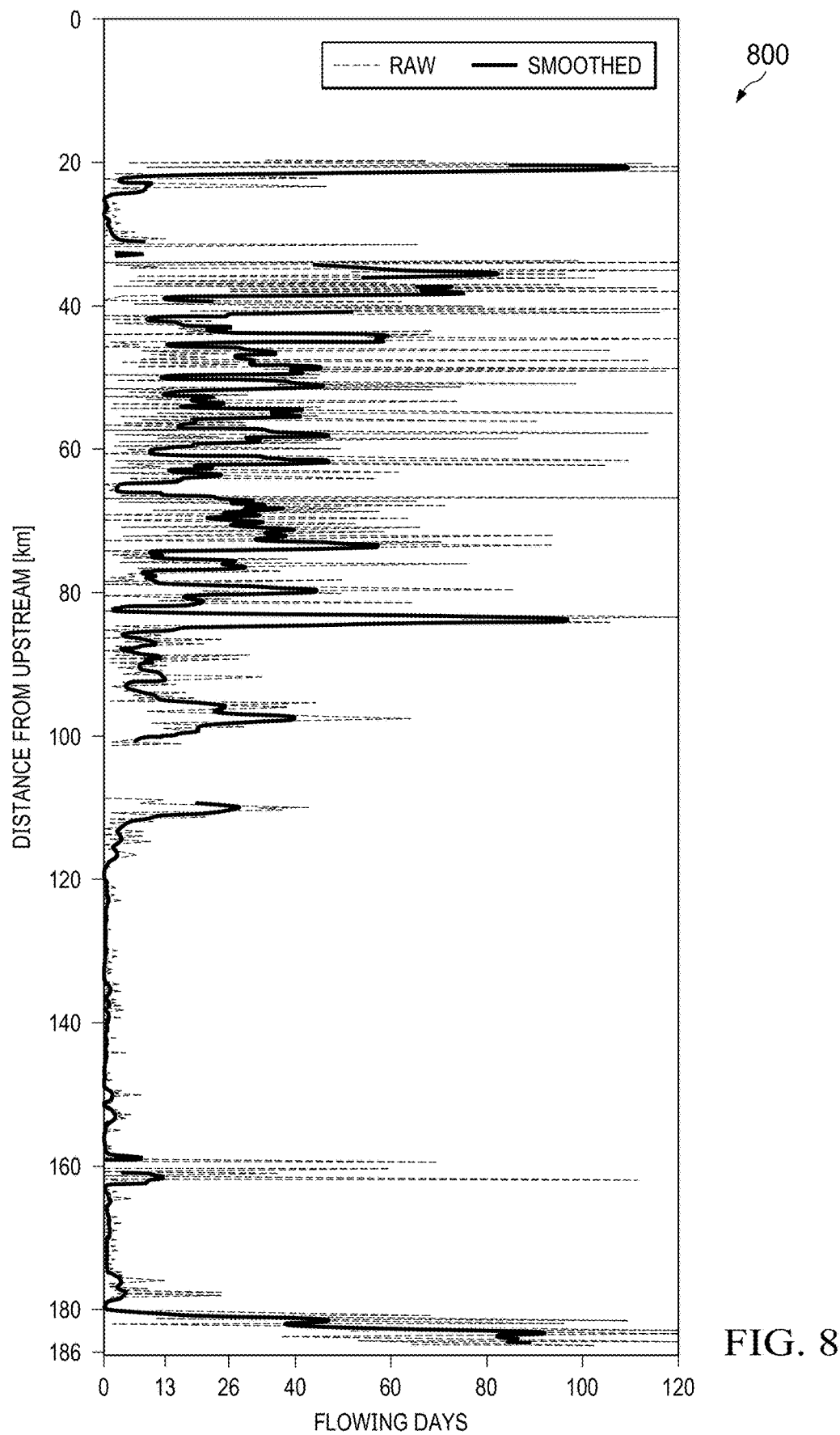
FIG. 8 depicts a chart that shows the average flowing days over the study period.

FIG. 8 depicts a chart 800 showing the average flowing days over 2019 to 2021. Most of Reach 7B and 5 were ephemeral, with average flowing days less than the threshold of 26. In contrast, Reach 4 had fewer flowing days, but a greater proportion of intermittent reaches due to the lower threshold of 13 days. Large extents of Reaches 3 and 1B exhibited a high number of flowing days and intermittent fractions (Table 3). Spatial variations in the characteristics of Reach 2A were identified with intermittent conditions observed upstream and downstream of a large riparian area known to be perennial in nature (grey shaded reach unavailable due to vegetation obstructions). Further downstream, however, the flow regime became more ephemeral, with the annual flowing days <3 days in Reaches 2B and 1A.

Figure 9:
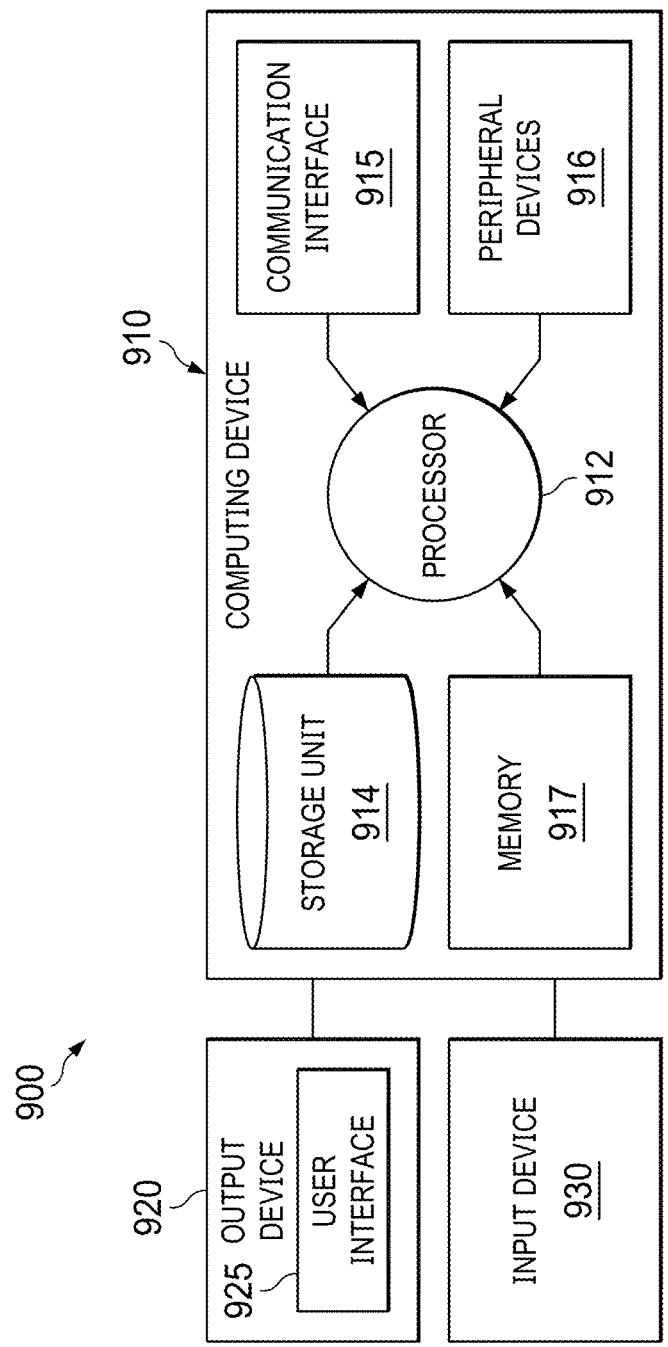
FIG. 9 depicts an example system that includes a computer or computing device that can be programmed or otherwise configured to implement systems or methods of the present disclosure.

FIG. 9 depicts an example system 900 that includes a computer or computing device 910 that can be programmed or otherwise configured to implement systems or methods of the present disclosure. For example, the computing device 910 can be programmed or otherwise configured to implement the process 200 described above with reference to FIG. 2.

In the depicted embodiment, the computer or computing device 910 includes an electronic processor (also "processor" and "computer processor" herein) 912, which is optionally a single core, a multi core processor, or a plurality of processors for parallel processing. The depicted embodiment also includes memory 917 (e.g., random-access memory, read-only memory, flash memory), electronic storage unit 914 (e.g., hard disk or flash), communication interface 915 (e.g., a network adapter or modem) for communicating with one or more other systems, and peripheral devices 916, such as cache, other memory, data storage, microphones, speakers, etc. In some embodiments, the memory 917, storage unit 914, communication interface 915 and peripheral devices 916 are in communication with the electronic processor 912 through a communication bus (shown as solid lines), such as a motherboard. In some embodiments, the bus of the computing device 910 includes multiple buses. In some embodiments, the computing device 910 includes more or fewer components than those illustrated in FIG. 9 and performs functions other than those described herein.

In some embodiments, the memory 917 and storage unit 914 include one or more physical apparatuses used to store data or programs on a temporary or permanent basis. In some embodiments, the memory 917 is volatile memory and requires power to maintain stored information. In some embodiments, the storage unit 914 is non-volatile memory and retains stored information when the computer is not powered. In further embodiments, memory 917 or storage unit 914 is a combination of devices such as those disclosed herein. In some embodiments, memory 917 or storage unit 914 is distributed across multiple machines such as a network-based memory or memory in multiple machines performing the operations of the computing device 910.

In some cases, the storage unit 914 is a data storage unit or data store for storing data. In some instances, the storage unit 914 store files, such as drivers, libraries, and saved programs. In some embodiments, the storage unit 914 stores user data (e.g., user preferences and user programs). In some embodiments, the computing device 910 includes one or more additional data storage units that are external, such as located on a remote server that is in communication through an intranet or the internet.

In some embodiments, methods as described herein are implemented by way of machine or computer executable code stored on an electronic storage location of the computing device 910, such as, for example, on the memory 917 or the storage unit 914. In some embodiments, the electronic processor 912 is configured to execute the code. In some embodiments, the machine executable or machine-readable code is provided in the form of software. In some examples, during use, the code is executed by the electronic processor 912. In some cases, the code is retrieved from the storage unit 914 and stored on the memory 917 for ready access by the electronic processor 912. In some situations, the storage unit 914 is precluded, and machine-executable instructions are stored on the memory 917.

Examples of operations performed by the electronic processor 912 can include fetch, decode, execute, and write back. In some cases, the electronic processor 912 is a component of a circuit, such as an integrated circuit. One or more other components of the computing device 910 can be optionally included in the circuit. In some cases, the circuit is an application specific integrated circuit (ASIC) or a field programmable gate arrays (FPGAs). In some cases, the operations of the electronic processor 912 can be distributed across multiple machines (where individual machines can have one or more processors) that can be coupled directly or across a network.

In some cases, the computing device 910 is optionally operatively coupled to a communication network, such as the network 1010 described with reference to FIG. 10, via the communication interface 915. In some cases, the computing device 910 communicates with one or more remote computer systems through the network. In some cases, a user can access the computing device 910 via the network. In some cases, the computing device 910 is configured as a node within a peer-to-peer network.

In some cases, the computing device 910 includes or is in communication with one or more output devices 920. In some cases, the output device 920 includes a display to send visual information to a user. In some cases, the output device 920 is a liquid crystal display (LCD). In other cases, the output device 920 is a thin film transistor liquid crystal display (TFT-LCD) or an organic light emitting diode (OLED) display. In some cases, the output device 920 is a touch sensitive display that combines a display with a touch sensitive element that is operable to sense touch inputs as and functions as both the output device 920 and the input device 930. In still further cases, the output device 920 is a combination of devices such as those disclosed herein. In some cases, the output device920 displays a user interface (UI) 925 generated by the computing device (for example, software executed by the computing device 910).

In some cases, the computing device 910 includes or is in communication with one or more input devices 930 that are configured to receive information from a user. In some cases, the input device 930 is a keyboard. In some cases, the input device 930 is a keypad (e.g., a telephone-based keypad). In some cases, the input device 930 is a cursor-control device including, by way of non-limiting examples, a mouse, trackball, track pad, joystick, game controller, or stylus. In some cases, as described above, the input device 930 is a touchscreen or a multi-touchscreen. In other cases, the input device 930 is a microphone to capture voice or other sound input. In other cases, the input device 930 is a camera or video camera. In still further cases, the input device is a combination of devices such as those disclosed herein.

In some cases, the computing device 910 includes an operating system configured to perform executable instructions. The operating system is, for example, software, including programs and data that manages the device's hardware and provides services for execution of applications.

It should also be noted that a plurality of hardware and software-based devices, as well as a plurality of different structural components may be used to implement the described examples. In addition, embodiments may include hardware, software, and electronic components or modules that, for purposes of discussion, may be illustrated and described as if most of the components were implemented solely in hardware. In some embodiments, the electronic based aspects of the disclosure may be implemented in software (e.g., stored on non-transitory computer-readable medium) executable by one or more processors, such as electronic processor 912. As such, it should be noted that a plurality of hardware and software-based devices, as well as a plurality of different structural components may be employed to implement various embodiments. It should also be understood that although certain drawings illustrate hardware and software located within particular devices, these depictions are for illustrative purposes only. In some embodiments, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 10:
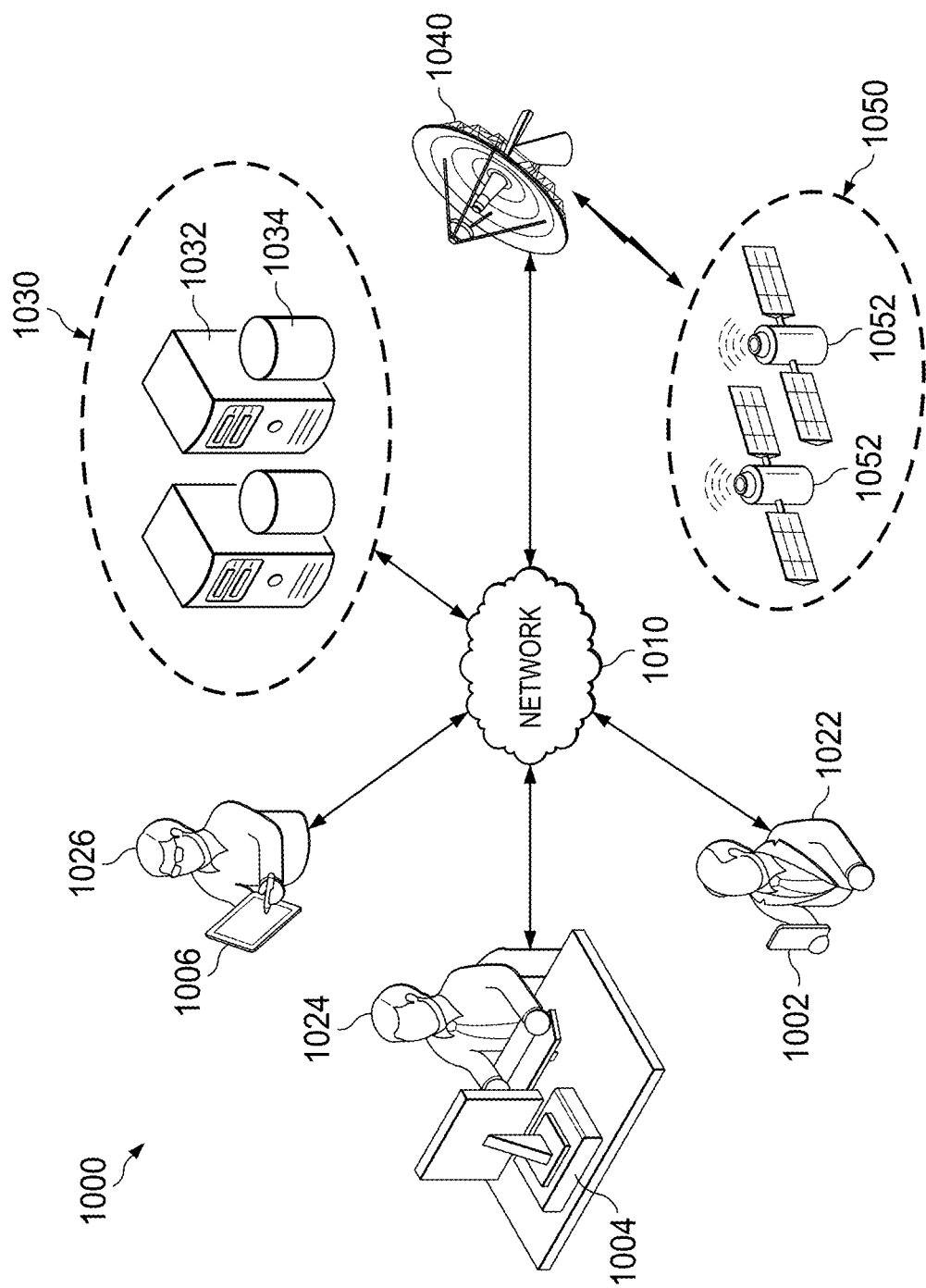
FIG. 10 depicts an example environment that can be employed to execute embodiments of the present disclosure.

FIG. 10 depicts an example environment 1000 that can be employed to execute embodiments of the present disclosure. The example system 1000 includes computing devices 1002, 1004, 1006; a back-end system 1030; a satellite transceiver 1040; a satellite constellation 1050, and a communication network 1010. The communication network (which may be an example of an "intervening internet protocol (IP) network") may include wireless and wired portions. In some cases, the communication network 1010 is implemented using one or more existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) network, and a public switched telephone network. The network may also include future developed networks. In some embodiments, the 1010 includes the Internet, an intranet, an extranet, or an intranet and/or extranet that is in communication with the Internet. In some embodiments, the network 1010 includes a telecommunication or a data network.

In some embodiments, the network 1010 connects web sites, devices (e.g., the computing devices 1002, 1004, and 1006), satellite transceiver 1040, and back-end systems (e.g., the back-end system 1030). In some embodiments, the network 1010 can be accessed over a wired or a wireless communications link. For example, mobile computing devices (e.g., the smartphone device 1010 and the tablet device 1006), can use a cellular network to access the network 1010.

In some examples, the users 1022, 1024, and 1026 interact with the system through a graphical user interface (GUI) or application that is installed and executing on their respective computing devices 1002, 1004, and 1006. In some examples, the computing devices 1002, 1004, and 1006 provide viewing data to screens with which the users 1022, 1024, and 1026, can interact. In some embodiments, the computing devices 1002, 1004, 1006 are sustainably similar to computing device 910 depicted in FIG. 9. The computing devices 1002, 1004, and 1006 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 1002, 1004, and 1006 are depicted in FIG. 10 for simplicity. In the depicted example environment 1000, the computing device 1002 is depicted as a smartphone, the computing device 1004 is depicted as a tablet-computing device, and the computing device 1006 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In some embodiments, the back-end system 1030 includes at least one server device 1032 and at least one data store 1034. In some embodiments, the device 1032 is sustainably similar to computing device 910 depicted in FIG. 9. In some embodiments, the back-end system 1030 may include server-class hardware type devices. In some embodiments, the server device 1032 is a server-class hardware type device. In some embodiments, the back-end system 1030 includes computer systems using clustered computers and components to act as a single pool of seamless resources when accessed through the network 1010. For example, such embodiments may be used in data center, cloud computing, storage area network (SAN), and network attached storage (NAS) applications. In some embodiments, the back-end system 1030 is deployed using a virtual machine(s). In some embodiments, the data store 1034 is a repository for persistently storing and managing collections of data. Example data store that may be employed within the described system include data repositories, such as a database as well as simpler store types, such as files, emails, and so forth. In some embodiments, the data store 1034 includes a database. In some embodiments, a database is a series of bytes or an organized collection of data that is managed by a database management system (DBMS). In some embodiments, the at least one server system 1032 hosts one or more computer-implemented services provided by the described system that users 1022, 1024, and 1026 can interact with using the respective computing devices 1002, 1004, and 1006.

In some embodiments, satellite constellation 1050 includes a group of satellites 1052 working together as a system. The satellites 1052 communicate with the radio transceiver 1040 (e.g., via a transponder). For example, the artificial satellites 1052 may be employed to collect a sequence of remote sensing data of a river, which are provided to the back-end system 1030 via the radio transceiver 1040 connected to the communications network 1010.

DISCUSSION

By their nature, non-perennial rivers in drylands are expected to have very high degrees of spatial and temporal variability in streamflow presence. However, direct evidence is limited to: (1) time series at few gauging stations and monitoring locations along a river, and (2) mapping performed by field crews and citizen scientists during short campaigns. While valuable, field methods are typically unable to detect rapid changes in water presence occurring over short distances due to infrequent storms. As shown here, remote sensing can provide a novel view of the spatiotemporal variability of streamflow presence over a large dryland river. In addition to estimating the annual flowing days with accuracy, derived products from the approach allow quantifying: (1) the fraction of a river that is flowing or has water presence for each day, and (2) the fraction of intermittent conditions within a river reach at 90 m resolution. As a result, a pressing national concern related to protecting non-perennial river reaches under the Clean Water Act can be addressed more appropriately.

The described system is based on recent progress in the Earth observing capacity of a commercial satellite constellation. As a result, the described example results have uncertainties despite their quality-control procedures. These include: (1) different local overpassing time, (2) temporal variations in the number of CubeSats and sensors on board, and (3) effects of clouds, shadows, and atmospheric haze. In addition, the study is limited to three water years due to the recent launch of the CubeSat constellation. As a result, additional data from ground observations (e.g., gauges, monitoring cameras, and field surveys) and a longer CubeSat record will help refine: (1) the derivation of the reach mask upon which the differencing method is based, and (2) the selection of the threshold to detect the cross-over period indicating flowing water. Additional work is also needed to differentiate between the spectral signature of flowing water and wet sediments more finely (e.g., using middle infrared band data from different satellites).

In some embodiments, various strategies (summarized in parenthesis) are employed to reduce uncertainties related to the quality of Planet images, which are categorized into three main categories: (1) differences in satellite overpassing times (select imagery with overpassing after 10 AM local time), (2) inconsistencies in the spectral characteristics of different PlanetScope sensors (use harmonized data from Planet), and (3) terrain shadow effects (identify days with significant shadow projected in reach from true color imagery and exclude those days). Third, in some examples, the described system relies on the different SRNIR responses between channel masks and their immediate surroundings, which requires accurate mapping of the channel at key locations. Finally, the selection of the SRNIR threshold heavily depends on the streamflow observations and the duration of Planet records. The accuracy of the flow regime results can be improved with more streamflow records or other ground observations (e.g., field surveys, time-lapse cameras, citizen science) along the HR. The Granato (2010) thresholds are determined from stream gauges that have at least 24 years of records during the period 1960-2004, while the Planet imagery used in this study only have 3 full years of records. The continued monitoring of flow conditions with this methodology over time is also recommended.

CONCLUSIONS

Examples employing the described system demonstrated that high resolution, near-daily remotely-sensed imagery from a constellation of small satellites can be applied to determine the streamflow regimes in, for example, the Hassayampa River, Arizona. Commercial satellite data products have reached the accuracy and resolutions required for resource management and regulatory activities, commensurate with traditional field-based techniques. The approach has the added benefit of mapping flow regimes in areas that are difficult to access for traditional methods. As a result, a pressing national concern related to protecting non-perennial river reaches under the Clean Water Act can be addressed more appropriately.

Results from the various examples described above can be summarized according to the following three points. (1) The high resolution and revisit frequency of PlanetScope provided a spatially-explicit (90 m) and continuous (near-daily) monitoring of channel conditions. Surface reflectance of the NIR band shows a good performance in capturing the changes in river conditions during flood events, which further demonstrates the feasibility of determining flow regime from PlanetScope data. (2) Long-term records from FCDMC and USGS provide valuable information for streamflow regime classification. In this study, ground data demonstrated the connection between flow occurrence and the difference of SRNIR within and outside of the channel. Observed flow days were also used as the ground truth to determine the threshold of surface reflectance difference. (3) The Hassayampa River has a strong spatiotemporal heterogeneity of flow days along its extent, which is a common characteristic of dryland rivers. Streamflow occurrence and duration also varies from year to year due to different amounts and frequency of precipitation events leading to flooding.

The remote-sensing analysis conducted in this study demonstrates that surface reflectance of NIR can be used to determine the streamflow regime. More importantly, this prototype system has the potential to be applied to large and remote areas in Arizona. In addition, the automated workflow opens opportunities for aiding decision-making about field monitoring protocols by helping to answer questions such as: "Where is sampling needed and how often for streamflow regime determination?". This has the capacity for significantly improving operational efficiency, while reducing the cost of environmental field sampling. As a result, a fruitful avenue of future work is to combine field observations and remote sensing to map the streamflow duration of non-perennial reaches and streams in Arizona and other rivers in arid and semiarid regions.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

The following paragraphs provide various examples of the embodiments disclosed herein.

Example 1 is a computer implemented method for determining varying phenomena in an environment. The method includes receiving, from a sensor, a sequence of RS data regarding the environment, wherein the environment comprises a target area where changes have occurred and a surrounding area where few or no changes have occurred leading to contrasting response between the target area and the surrounding area; processing the RS data to determine signals for the changes that have occurred in the target area and where no changes have occurred in the surrounding area, wherein the signals comprise reflected sunlight radiation or returned light or radiation of different wavelengths captured by the sensor; processing the signals to determining environment data indicating the varying phenomena in the environment, wherein the varying phenomena in the environment comprise changes in the physical characteristics of the target area and an amount of radiation captured by the RS data; and providing the environment data for display via a user device.

Example 2 includes the subject matter of Example 1, and further specifies that the RS data comprises imagery or photographs.

Example 3 includes the subject matter of any of Examples 1 and 2, and further specifies that the sensor comprises active sensors or passive sensors; the active sensors include a laser altimeter, a lidar, or a radar; and the passive sensors include spectral radiometer or spectrometer.

Example 4 includes the subject matter of any of Examples 1-3, and further specifies that the environment data is determined based on a spatial average of the RS signals in the target area and the surrounding area.

Example 5 includes the subject matter of any of Examples 1-4, and further specifies that few changes include changes less than +10 percent.

Example 6 includes the subject matter of any of Examples 1-5, and further includes providing, to a server device, the RS data for post-processing and analysis.

Example 7 includes the subject matter of any of Examples 1-6, and further specifies that the target area comprises a river, the surrounding area comprise a plurality of river reach segments, and the varying phenomena comprise a streamflow presence for the river.

Example 8 includes the subject matter of any of Examples 1-7, and further includes determining a rectangular buffer perpendicular to a river reach line of the river for each river reach segment; determining a channel mask by calculating changes in the RS indexes between flood and dry conditions and applying a clustering algorithm; determining, as a RS index difference, the difference of the RS index between inside and outside the channel mask for each of the plurality of river reach segments; determining an optimal threshold of the RS index difference based on a comparison with streamflow observations from gauges; and determining the streamflow presence for the river based on a surface reflectance for each of the plurality of river reach segments.

Example 9 includes the subject matter of any of Examples 1-8, and further specifies that the RS indexes include a surface reflectance of NIR, or other indexes derived from the NIR surface reflectance.

Example 10 includes the subject matter of any of Examples 1-9, and further specifies that each of the plurality of river reach segments are approximately 90 meters in length along the river.

Example 11 includes the subject matter of any of Examples 1-10, and further specifies that the sequence of RS data is collected by a plurality of satellites.

Example 12 includes the subject matter of any of Examples 1-11, and further specifies that the plurality of satellites comprises a constellation of small satellites.

Example 13 includes the subject matter of any of Examples 1-12, and further specifies that a width of each of the rectangular buffers is set at approximately 1000 meters.

Example 14 includes the subject matter of any of Examples 1-13, and further specifies that some of the rectangular buffers extend to 1600 meters due to a braided nature of the river reaches.

Example 15 includes the subject matter of any of Examples 1-14, and further specifies that the presence of water inside the channel mask leads to a large difference in the near infrared band reflectance as compared to areas outside of a channel where flow did not occur.

Example 16 includes the subject matter of any of Examples 1-15, and further specifies that the rectangular buffer includes possible flooding areas.

Example 17 includes the subject matter of any of Examples 1-16, and further specifies that the clustering algorithm is a k-means clustering algorithm.

Example 18 is system for determining varying phenomena in an environment. The system includes a user device and an electronic processor. The processor is configured to receive, from a sensor, a sequence of RS data regarding the environment, wherein the environment comprises a target area where changes have occurred and a surrounding area where few or no changes have occurred leading to contrasting response between the target area and the surrounding area; process the RS data to determine signals for the changes that have occurred in the target area and where no changes have occurred in the surrounding area, wherein the signals comprise reflected sunlight radiation or returned light or radiation of different wavelengths captured by the sensor; process the signals to determining environment data indicating the varying phenomena in the environment, wherein the varying phenomena in the environment comprise changes in the physical characteristics of the target area and an amount of radiation captured by the RS data; and provide the environment data for display via the user device.

Example 19 includes the subject matter of Example 18, and further specifies that the RS data comprises imagery or photographs.

Example 20 includes the subject matter of any of Examples 18 and 19, and further specifies that the sensor comprises active sensors or passive sensors; the active sensors include a laser altimeter, a lidar, or a radar; and the passive sensors include spectral radiometer or spectrometer.

Example 21 includes the subject matter of any of Examples 18-20, and further specifies that the environment data is determined based on a spatial average of the RS signals in the target area and the surrounding area.

Example 22 includes the subject matter of any of Examples 18-21, and further specifies that few changes include changes less than +10 percent.

Example 23 includes the subject matter of any of Examples 18-22, and further specifies that processor is configured to provide, to a server device, the RS data for post-processing and analysis.

Example 24 includes the subject matter of any of Examples 18-23, and further specifies that the target area comprises a river, the surrounding area comprise a plurality of river reach segments, and the varying phenomena comprise a streamflow presence for the river.

Example 25 includes the subject matter of any of Examples 18-24, and further specifies that processor is configured to determine a rectangular buffer perpendicular to a river reach line of the river for each river reach segment; determine a channel mask by calculating changes in the RS indexes between flood and dry conditions and applying a clustering algorithm; determine, as a RS index difference, the difference of the RS index between inside and outside the channel mask for each of the plurality of river reach segments; determine an optimal threshold of the RS index difference based on a comparison with streamflow observations from gauges; and determine the streamflow presence for the river based on a surface reflectance for each of the plurality of river reach segments.

Example 26 includes the subject matter of any of Examples 18-25, and further specifies that the RS indexes include a surface reflectance of NIR, or other indexes derived from the NIR surface reflectance.

Example 27 includes the subject matter of any of Examples 18-26, and further specifies that each of the plurality of river reach segments are approximately 90 meters in length along the river.

Example 28 includes the subject matter of any of Examples 18-27, and further specifies that the sequence of RS data is collected by a plurality of satellites.

Example 29 includes the subject matter of any of Examples 18-28, and further specifies that the plurality of satellites comprises a constellation of small satellites.

Example 30 includes the subject matter of any of Examples 18-29, and further specifies that a width of each of the rectangular buffers is set at approximately 1000 meters.

Example 31 includes the subject matter of any of Examples 18-30, and further specifies that some of the rectangular buffers extend to 1600 meters due to a braided nature of the river reaches.

Example 32 includes the subject matter of any of Examples 18-31, and further specifies that the presence of water inside the channel mask leads to a large difference in the near infrared band reflectance as compared to areas outside of a channel where flow did not occur.

Example 33 includes the subject matter of any of Examples 18-32, and further specifies that the rectangular buffer includes possible flooding areas.

Example 34 includes the subject matter of any of Examples 18-33, and further specifies that the clustering algorithm is a k-means clustering algorithm.

Example 35 is non-transitory computer-readable storage media coupled to an electronic processor and having instructions stored thereon which, when executed by the electronic processor, cause the electronic processor to perform operations. The operations include receiving, from a sensor, a sequence of remote sensing (RS) data regarding an environment, wherein the environment comprises a target area where changes have occurred and a surrounding area where few or no changes have occurred leading to contrasting response between the target area and the surrounding area; processing the RS data to determine signals for the changes that have occurred in the target area and where no changes have occurred in the surrounding area, wherein the signals comprise reflected sunlight radiation or returned light or radiation of different wavelengths captured by the sensor; processing the signals to determining environment data indicating varying phenomena in the environment, wherein the varying phenomena in the environment comprise changes in the physical characteristics of the target area and an amount of radiation captured by the RS data; and providing the environment data for display via a user device.

Example 36 includes the subject matter of Example 35, and further specifies that the RS data comprises imagery or photographs.

Example 37 includes the subject matter of any of Examples 35 and 36, and further specifies that the sensor comprises active sensors or passive sensors; the active sensors include a laser altimeter, a lidar, or a radar; and the passive sensors include spectral radiometer or spectrometer.

Example 38 includes the subject matter of any of Examples 35-37, and further specifies that the environment data is determined based on a spatial average of the RS signals in the target area and the surrounding area.

Example 39 includes the subject matter of any of Examples 35-38, and further specifies that few changes include changes less than +10 percent.

Example 40 includes the subject matter of any of Examples 35-39, and further specifies that operations include providing, to a server device, the RS data for post-processing and analysis.

Example 41 includes the subject matter of any of Examples 35-40, and further specifies that the target area comprises a river, the surrounding area comprise a plurality of river reach segments, and the varying phenomena comprise a streamflow presence for the river.

Example 42 includes the subject matter of any of Examples 35-41, and further specifies that operations includes determining a rectangular buffer perpendicular to a river reach line of the river for each river reach segment; determining a channel mask by calculating changes in the RS indexes between flood and dry conditions and applying a clustering algorithm; determine, as a RS index difference, the difference of the RS index between inside and outside the channel mask for each of the plurality of river reach segments; determining an optimal threshold of the RS index difference based on a comparison with streamflow observations from gauges; and determining the streamflow presence for the river based on a surface reflectance for each of the plurality of river reach segments.

Example 43 includes the subject matter of any of Examples 35-42, and further specifies that the RS indexes include a surface reflectance of NIR, or other indexes derived from the NIR surface reflectance.

Example 44 includes the subject matter of any of Examples 35-43, and further specifies that each of the plurality of river reach segments are approximately 90 meters in length along the river.

Example 45 includes the subject matter of any of Examples 35-44, and further specifies that the sequence of RS data is collected by a plurality of satellites.

Example 46 includes the subject matter of any of Examples 35-45, and further specifies that the plurality of satellites comprises a constellation of small satellites.

Example 47 includes the subject matter of any of Examples 35-46, and further specifies that a width of each of the rectangular buffers is set at approximately 1000 meters.

Example 48 includes the subject matter of any of Examples 35-47, and further specifies that some of the rectangular buffers extend to 1600 meters due to a braided nature of the river reaches.

Example 49 includes the subject matter of any of Examples 35-48, and further specifies that the presence of water inside the channel mask leads to a large difference in the near infrared band reflectance as compared to areas outside of a channel where flow did not occur.

Example 50 includes the subject matter of any of Examples 35-49, and further specifies that the rectangular buffer includes possible flooding areas.

Example 51 includes the subject matter of any of Examples 35-50, and further specifies that the clustering algorithm is a k-means clustering algorithm.

What is claimed is:

1. A computer implemented method for determining varying phenomena in an environment, the method comprising:
receiving, from a sensor, a sequence of remote sensing (RS) data regarding the environment, wherein the environment comprises a target area where changes have occurred and a surrounding area where few or no changes have occurred leading to contrasting response between the target area and the surrounding area;
processing the RS data to determine signals for the changes that have occurred in the target area and where no changes have occurred in the surrounding area, wherein the signals comprise reflected sunlight radiation or returned light or radiation of different wavelengths captured by the sensor;

processing the signals to determine environment data indicating the varying phenomena in the environment, wherein the varying phenomena in the environment comprises changes in the physical characteristics of the target area and an amount of radiation captured by the RS data; and providing the environment data for display via a user device, wherein the target area comprises a river, wherein the surrounding area comprises a plurality of river reach segments, and wherein the varying phenomena comprises a streamflow presence for the river, determining a rectangular buffer perpendicular to a river reach line of the river for each river reach segment;

determining a channel mask by calculating changes in the RS indexes between flood and dry conditions and applying a clustering algorithm;

determining, as a RS index difference, the difference of the RS index between inside and outside the channel mask for each of the plurality of river reach segments;

determining an optimal threshold of the RS index difference based on a comparison with streamflow observations from gauges; and determining the streamflow presence for the river based on a surface reflectance for each of the plurality of river reach segments.

2. The method of claim 1, wherein the RS data comprises imagery or photographs.

3. The method of claim 1, wherein the sensor comprises active sensors or passive sensors; wherein the active sensors include a laser altimeter, a lidar, or a radar; and wherein the passive sensors include spectral radiometer or spectrometer.

4. The method of claim 1, wherein the environment data is determined based on a spatial average of the RS signals in the target area and the surrounding area.

5. The method of claim 1, wherein few changes include changes less than +10 percent.

6. The method of claim 1, comprising: providing, to a server device, the RS data for post-processing and analysis.

7. The method of claim 1, wherein the RS indexes include a surface reflectance of Near Infrared (NIR), or other indexes derived from the NIR surface reflectance.

8. The method of claim 1, wherein each of the plurality of river reach segments are approximately 90 meters in length along the river.

9. The method of claim 1, wherein the sequence of RS data is collected by a plurality of satellites.

10. The method of claim 9, wherein the plurality of satellites comprises a constellation of small satellites.

11. The method of claim 1, wherein a width of each of the rectangular buffers is set at approximately 1000 meters.

12. The method of claim 11, wherein some of the rectangular buffers extend to 1600 meters due to a braided nature of the river reaches.

13. The method of claim 1, wherein the presence of water inside the channel mask leads to a large difference in the near infrared band reflectance as compared to areas outside of a channel where flow did not occur.

14. The method of claim 1, wherein the rectangular buffer includes possible flooding areas.

15. The method of claim 1, wherein the clustering algorithm is a k-means clustering algorithm.

16. A system for determining varying phenomena in an environment, comprising:

a user device; and an electronic processor configured to:

receive, from a sensor, a sequence of remote sensing (RS) data regarding the environment, wherein the environment comprises a target area where changes have occurred and a surrounding area where few or no changes have occurred leading to contrasting response between the target area and the surrounding area;

process the RS data to determine signals for the changes that have occurred in the target area and where no changes have occurred in the surrounding area, wherein the signals comprise reflected sunlight radiation or returned light or radiation of different wavelengths captured by the sensor;

process the signals to determine environment data indicating the varying phenomena in the environment, wherein the varying phenomena in the environment comprises changes in the physical characteristics of the target area and an amount of radiation captured by the RS data;

provide the environment data for display via the user device, wherein the target area comprises a river, wherein the surrounding area comprises a plurality of river reach segments, and wherein the varying phenomena comprises a streamflow presence for the river, determine a rectangular buffer perpendicular to a river reach line of the river for each river reach segment;

determine a channel mask by calculating changes in the RS indexes between flood and dry conditions and applying a clustering algorithm;

determine, as a RS index difference, the difference of the RS index between inside and outside the channel mask for each of the plurality of river reach segments;

determine an optimal threshold of the RS index difference based on a comparison with streamflow observations from gauges; and determine the streamflow presence for the river based on a surface reflectance for each of the plurality of river reach segments.

17. The system of claim 16, wherein the environment data is determined based on a spatial average of the RS signals in the target area and the surrounding area.

18. A non-transitory computer-readable storage media coupled to an electronic processor and having instructions stored thereon which, when executed by the electronic processor, cause the electronic processor to perform operations comprising:

receiving, from a sensor, a sequence of remote sensing (RS) data regarding an environment, wherein the environment comprises a target area where changes have occurred and a surrounding area where few or no changes have occurred leading to contrasting response between the target area and the surrounding area;

processing the RS data to determine signals for the changes that have occurred in the target area and where no changes have occurred in the surrounding area, wherein the signals comprise reflected sunlight radiation or returned light or radiation of different wavelengths captured by the sensor;

processing the signals to determining environment data indicating varying phenomena in the environment, wherein the varying phenomena in the environment comprise changes in the physical characteristics of the target area and an amount of radiation captured by the RS data;

providing the environment data for display via a user device, wherein the target area comprises a river, wherein the surrounding area comprise a plurality of river reach segments, and wherein the varying phenomena comprise a streamflow presence for the river, determining a rectangular buffer perpendicular to a river reach line of the river for each river reach segment;

determining a channel mask by calculating changes in the RS indexes between flood and dry conditions and applying a clustering algorithm;

determining, as a RS index difference, the difference of the RS index between inside and outside the channel mask for each of the plurality of river reach segments;

determining an optimal threshold of the RS index difference based on a comparison with streamflow observations from gauges; and determining the streamflow presence for the river based on a surface reflectance for each of the plurality of river reach segments.

* * * * *